(12) United States Patent
Hasegawa et al.

(10) Patent No.: US 9,209,743 B2
(45) Date of Patent: Dec. 8, 2015

(54) FAULT DETECTION APPARATUS AND FAULT DETECTION METHOD

(75) Inventors: Yoshiaki Hasegawa, Chofu (JP); Makoto Sato, Yokohama (JP); Akihiro Suyama, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 657 days.

(21) Appl. No.: 13/594,340

(22) Filed: Aug. 24, 2012

(65) Prior Publication Data

US 2012/0323507 A1    Dec. 20, 2012

Related U.S. Application Data

(63) Continuation of application No. PCT/JP2010/068873, filed on Oct. 25, 2010.

(30) Foreign Application Priority Data

Feb. 26, 2010 (JP) ................................. 2010-042897
Apr. 23, 2010 (JP) ................................. 2010-100113

(51) Int. Cl.
*G01R 31/11* (2006.01)
*H02S 50/10* (2014.01)

(52) U.S. Cl.
CPC ....................................... *H02S 50/10* (2013.01)

(58) Field of Classification Search
CPC ....... G01R 31/08; G01R 31/085; G06F 19/00
See application file for complete search history.

(56) References Cited

U.S. PATENT DOCUMENTS

| 5,669,987 | A * | 9/1997 | Takehara et al. ............... 136/244 |
| 5,719,758 | A * | 2/1998 | Nakata et al. .................... 363/98 |
| 2006/0085167 | A1 * | 4/2006 | Warfield et al. ................ 702/188 |
| 2009/0000659 | A1 * | 1/2009 | Hasegawa et al. ............. 136/252 |
| 2009/0127448 | A1 * | 5/2009 | Fuyuki ........................... 250/238 |

(Continued)

FOREIGN PATENT DOCUMENTS

| CN | 1124847 A | 6/1996 |
| CN | 101636847 A | 1/2010 |

(Continued)

OTHER PUBLICATIONS

Stellbogen (Use of PV Circuit Simulation for Fault Detection in PV Array Fields, 1993).*

(Continued)

*Primary Examiner* — Sujoy Kundu
*Assistant Examiner* — Alvaro Fortich
(74) *Attorney, Agent, or Firm* — Oblon, McClelland, Maier & Neustadt, L.L.P.

(57) ABSTRACT

According to one embodiment, an apparatus includes an first storage unit to store a value output by a communication unit, a second storage unit to store positional data indicating a place the modules, an third storage unit to store an output model indicating the relationship between a sunshine condition and an electrical output, a estimation unit to estimate a sunshine condition for each module based on the value and the output model, a forth storage unit to store the sunshine condition estimated, a correction unit to correct the sunshine condition, and a detection unit to calculate an expected electrical output for each module based on the corrected sunshine condition and the output model, and to detect a fault in the modules.

27 Claims, 29 Drawing Sheets

(56) References Cited

U.S. PATENT DOCUMENTS

| | | | |
|---|---|---|---|
| 2009/0207543 A1* | 8/2009 | Boniface et al. | 361/86 |
| 2009/0283128 A1* | 11/2009 | Zhang et al. | 136/244 |
| 2010/0106339 A1* | 4/2010 | Little et al. | 700/293 |
| 2010/0185337 A1* | 7/2010 | Le Pivert | 700/291 |
| 2011/0066401 A1* | 3/2011 | Yang et al. | 702/184 |
| 2011/0282601 A1* | 11/2011 | Hoff | 702/60 |
| 2011/0282602 A1* | 11/2011 | Hoff | 702/60 |
| 2012/0111391 A1* | 5/2012 | Shamseldein et al. | 136/249 |
| 2013/0284233 A1* | 10/2013 | Kataoka et al. | 136/244 |
| 2014/0312700 A1* | 10/2014 | Catthoor et al. | 307/77 |

FOREIGN PATENT DOCUMENTS

| | | |
|---|---|---|
| EP | 0 677 749 A2 | 10/1995 |
| JP | 8-185235 | 7/1997 |
| JP | 2874156 | 1/1999 |
| JP | 2005-340464 | 12/2005 |
| JP | 2006-310780 | 11/2006 |
| JP | 2008-91828 | 4/2008 |
| JP | 2008-271693 | 11/2008 |
| WO | WO 2008/125915 A2 * | 10/2008 |

OTHER PUBLICATIONS

International Search Report mailed Feb. 8, 2011 in PCT/JP2010/068873 filed Oct. 25, 2011 (with English translation).

Internation Written Opinion mailed Feb. 8, 2011 in PCT/JP2010/068873 filed Oct. 25, 2011.

Extended Search Report issue Oct. 4, 2013 in European Patent Application No. 10846594.9.

Dirk Stellbogen, "Use of PV Circuit Simulation for Fault Detection in PV Array Fields", Proceedings of the Photovoltaic Specialists Conference, vol. CONF. 23, XP010113215, May 10, 1993, pp. 1302-1307.

Chinese Office Action issued Apr. 30, 2014, in China Patent Application No. 201080055255.8 (with English translation).

International Preliminary Report on Patentability issued Sep. 27, 2012, in PCT/JP2010/068873, filed Oct. 25, 2010 (submitting English translation only).

Written Opinion of the International Searching Authority issued Feb. 8, 2011, in PCT/JP2010/068873, filed Oct. 25, 2010 (submitting English translation only).

* cited by examiner

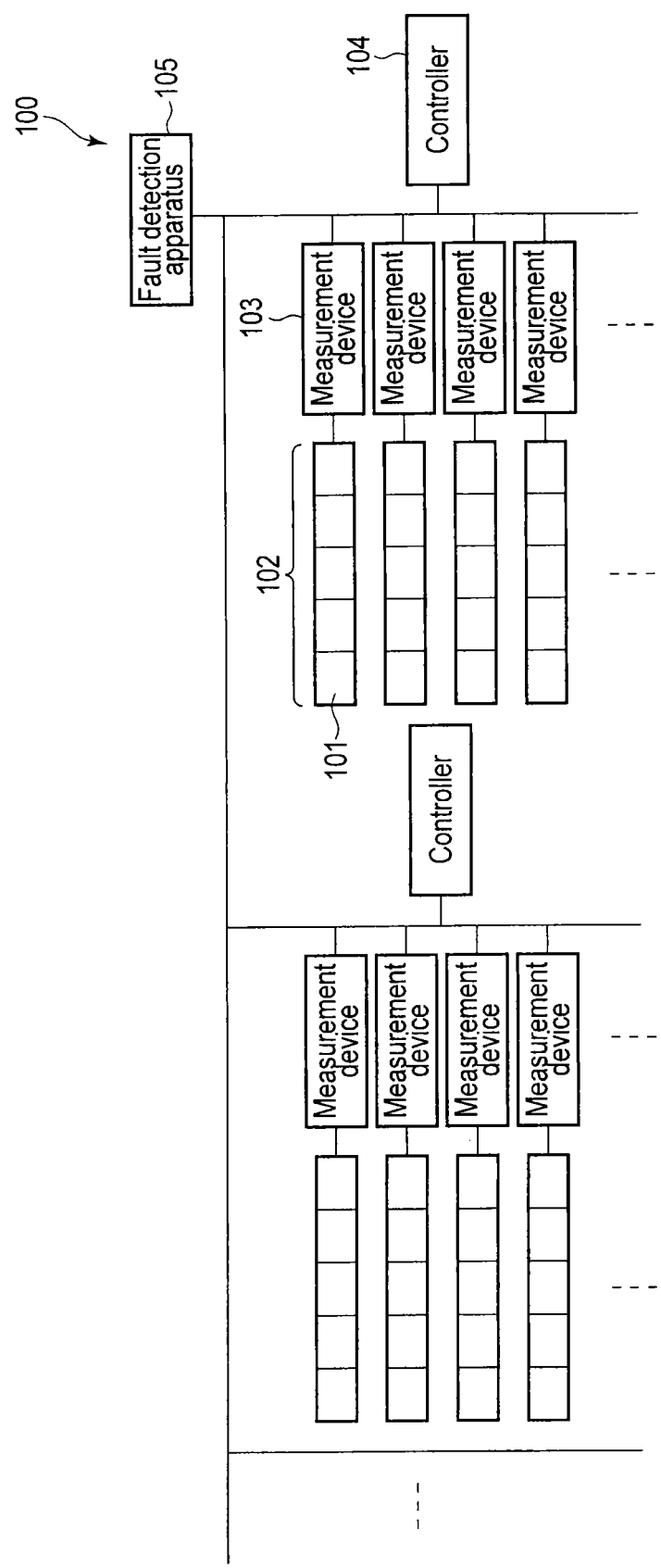
F I G. 1

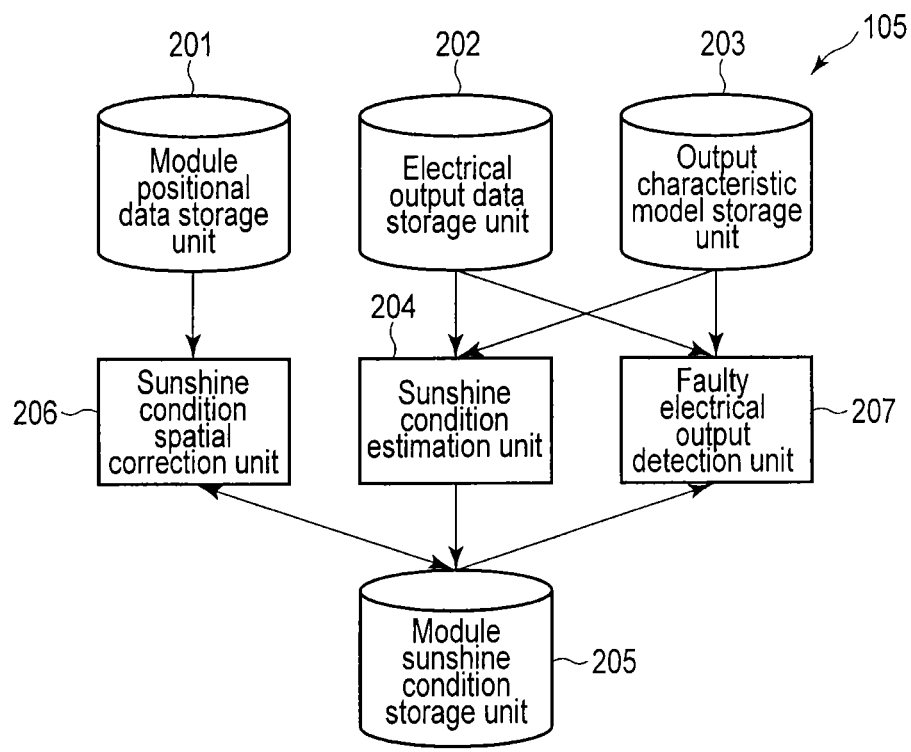
F I G. 2
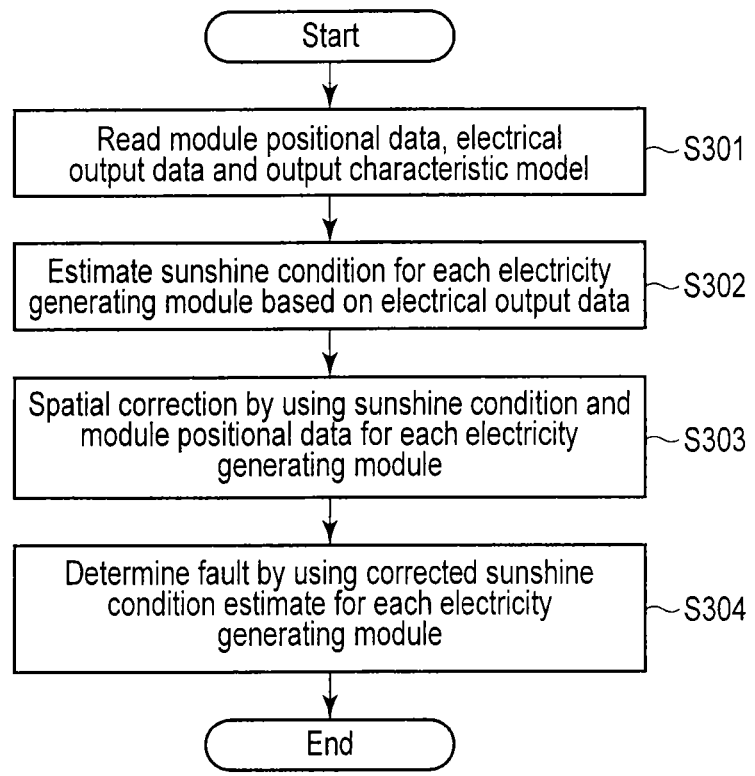
F I G. 3

FIG. 4A

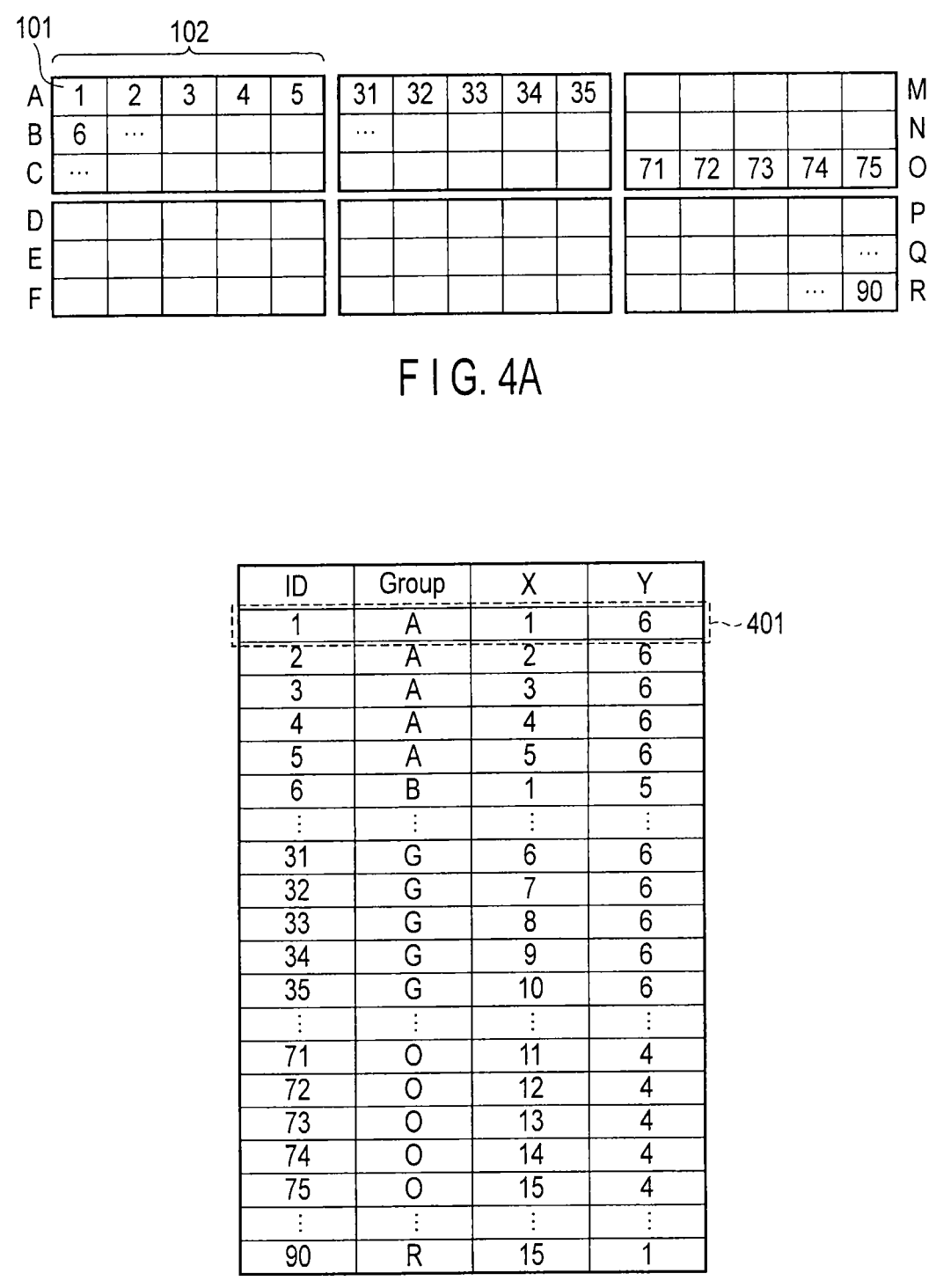

| | 101 | 102 | | | | | | | | | | | | | | |
|---|---|---|---|---|---|---|---|---|---|---|---|---|---|---|---|---|
| A | 1 | 2 | 3 | 4 | 5 | 31 | 32 | 33 | 34 | 35 | | | | | | M |
| B | 6 | ... | | | | ... | | | | | | | | | | N |
| C | ... | | | | | | | | | | 71 | 72 | 73 | 74 | 75 | O |
| D | | | | | | | | | | | | | | | | P |
| E | | | | | | | | | | | | | | | ... | Q |
| F | | | | | | | | | | | | | | | ... 90 | R |

FIG. 4B

| ID | Group | X | Y |
|---|---|---|---|
| 1 | A | 1 | 6 | ←401
| 2 | A | 2 | 6 |
| 3 | A | 3 | 6 |
| 4 | A | 4 | 6 |
| 5 | A | 5 | 6 |
| 6 | B | 1 | 5 |
| ⋮ | ⋮ | ⋮ | ⋮ |
| 31 | G | 6 | 6 |
| 32 | G | 7 | 6 |
| 33 | G | 8 | 6 |
| 34 | G | 9 | 6 |
| 35 | G | 10 | 6 |
| ⋮ | ⋮ | ⋮ | ⋮ |
| 71 | O | 11 | 4 |
| 72 | O | 12 | 4 |
| 73 | O | 13 | 4 |
| 74 | O | 14 | 4 |
| 75 | O | 15 | 4 |
| ⋮ | ⋮ | ⋮ | ⋮ |
| 90 | R | 15 | 1 |

| Group | Electrical output(kW) |
|---|---|
| A | 204 |
| B | 206 |
| C | 216 |
| D | 414 |
| E | 911 |
| F | 1010 |
| G | 426 |
| H | 618 |
| I | 720 |
| J | 862 |
| K | 990 |
| L | 990 |
| M | 950 |
| N | 950 |
| O | 890 |
| P | 1060 |
| Q | 1070 |
| R | 920 |

<r>
| | | | | | | | | | | | | | | | |
|---|---|---|---|---|---|---|---|---|---|---|---|---|---|---|---|
| A | 1.03 | 1.03 | 1.03 | 1.03 | 1.03 | 1.02 | 1.02 | 1.02 | 1.02 | 1.02 | 0.95 | 0.95 | 0.95 | 0.95 | 0.95 | M |
| B | 1.02 | 1.02 | 1.02 | 1.02 | 1.02 | 1.03 | 1.03 | 1.03 | 1.03 | 1.03 | 0.99 | 0.99 | 0.99 | 0.99 | 0.99 | N |
| C | 0.98 | 0.98 | 0.98 | 0.98 | 0.98 | 1.01 | 1.01 | 1.01 | 1.01 | 1.01 | 1.10 | 1.10 | 1.10 | 1.10 | 1.10 | O |
| D | 0.95 | 0.95 | 0.95 | 0.95 | 0.95 | 0.99 | 0.99 | 0.99 | 0.99 | 0.99 | 1.05 | 1.05 | 1.05 | 1.05 | 1.05 | P |
| E | 0.99 | 0.99 | 0.99 | 0.99 | 0.99 | 0.98 | 0.98 | 0.98 | 0.98 | 0.98 | 1.09 | 1.09 | 1.09 | 1.09 | 1.09 | Q |
| F | 1.00 | 1.00 | 1.00 | 1.00 | 1.00 | 0.97 | 0.97 | 0.97 | 0.97 | 0.97 | 0.92 | 0.92 | 0.92 | 0.92 | 0.92 | R |
F I G. 6A
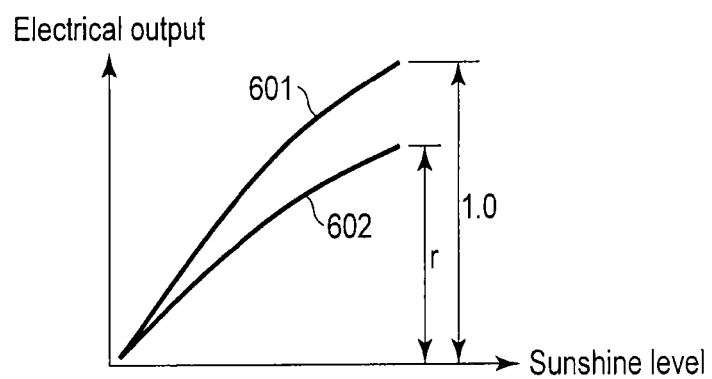
F I G. 6B

| | 101 | 102 | | | | | | | | 901 | | | | | | |
|---|---|---|---|---|---|---|---|---|---|---|---|---|---|---|---|---|
| A | 0.198 | 0.198 | 0.198 | 0.198 | 0.198 | 0.418 | 0.418 | 0.418 | 0.418 | 0.418 | 1.000 | 1.000 | 1.000 | 1.000 | 1.000 | M |
| B | 0.202 | 0.202 | 0.202 | 0.202 | 0.202 | 0.600 | 0.600 | 0.600 | 0.600 | 0.600 | 0.960 | 0.960 | 0.960 | 0.960 | 0.960 | N |
| C | 0.220 | 0.220 | 0.220 | 0.220 | 0.220 | 0.713 | 0.713 | 0.713 | 0.713 | 0.713 | 0.985 | 0.985 | 0.985 | 0.985 | 0.985 | O |
| D | 0.435 | 0.435 | 0.435 | 0.435 | 0.435 | 0.871 | 0.871 | 0.871 | 0.871 | 0.871 | 1.010 | 1.010 | 1.010 | 1.010 | 1.010 | P |
| E | 0.920 | 0.920 | 0.920 | 0.920 | 0.920 | 1.010 | 1.010 | 1.010 | 1.010 | 1.010 | 1.005 | 1.005 | 1.005 | 1.005 | 1.005 | Q |
| F | 1.010 | 1.010 | 1.010 | 1.010 | 1.010 | 1.021 | 1.021 | 1.021 | 1.021 | 1.021 | 1.000 | 1.000 | 1.000 | 1.000 | 1.000 | R |

FIG. 9A

| 0.198 | 0.198 | 0.198 | 0.198 | 0.198 | 0.198 | 0.198 | 0.198 | 0.496 | 1.000 | 1.000 | 1.000 | 1.000 | 1.000 | 1.000 |
|---|---|---|---|---|---|---|---|---|---|---|---|---|---|---|
| 0.202 | 0.202 | 0.202 | 0.202 | 0.202 | 0.202 | 0.202 | 0.202 | 0.676 | 0.960 | 0.960 | 0.960 | 0.960 | 0.960 | 0.960 |
| 0.220 | 0.220 | 0.220 | 0.220 | 0.220 | 0.220 | 0.220 | 0.390 | 0.985 | 0.985 | 0.985 | 0.985 | 0.985 | 0.985 | 0.985 |
| 0.435 | 0.435 | 0.435 | 0.435 | 0.435 | 0.435 | 0.890 | 1.010 | 1.010 | 1.010 | 1.010 | 1.010 | 1.010 | 1.010 | 1.010 |
| 0.920 | 0.920 | 0.920 | 0.920 | 0.920 | 1.010 | 1.010 | 1.010 | 1.010 | 1.005 | 1.005 | 1.005 | 1.005 | 1.005 | 1.005 |
| 1.010 | 1.010 | 1.010 | 1.010 | 1.010 | 1.021 | 1.021 | 1.021 | 1.021 | 1.000 | 1.000 | 1.000 | 1.000 | 1.000 | 1.000 |

FIG. 9B

| 0.200 | 0.200 | 0.200 | 0.200 | 0.200 | 0.200 | 0.279 | 0.455 | 0.715 | 0.896 | 0.980 | 0.980 | 0.980 | 0.980 | 0.980 |
| 0.207 | 0.207 | 0.207 | 0.207 | 0.207 | 0.226 | 0.363 | 0.566 | 0.805 | 0.925 | 0.981 | 0.981 | 0.981 | 0.981 | 0.981 |
| 0.286 | 0.286 | 0.286 | 0.286 | 0.286 | 0.355 | 0.557 | 0.790 | 0.953 | 0.985 | 0.985 | 0.985 | 0.985 | 0.985 | 0.985 |
| 0.525 | 0.525 | 0.525 | 0.525 | 0.535 | 0.615 | 0.774 | 0.922 | 1.001 | 1.001 | 1.000 | 1.000 | 1.000 | 1.000 | 1.000 |
| 0.788 | 0.788 | 0.788 | 0.788 | 0.800 | 0.862 | 0.937 | 1.000 | 1.013 | 1.011 | 1.008 | 1.005 | 1.005 | 1.005 | 1.005 |
| 0.965 | 0.965 | 0.965 | 0.965 | 0.982 | 0.999 | 1.015 | 1.015 | 1.015 | 1.011 | 1.007 | 1.002 | 1.002 | 1.002 | 1.002 |

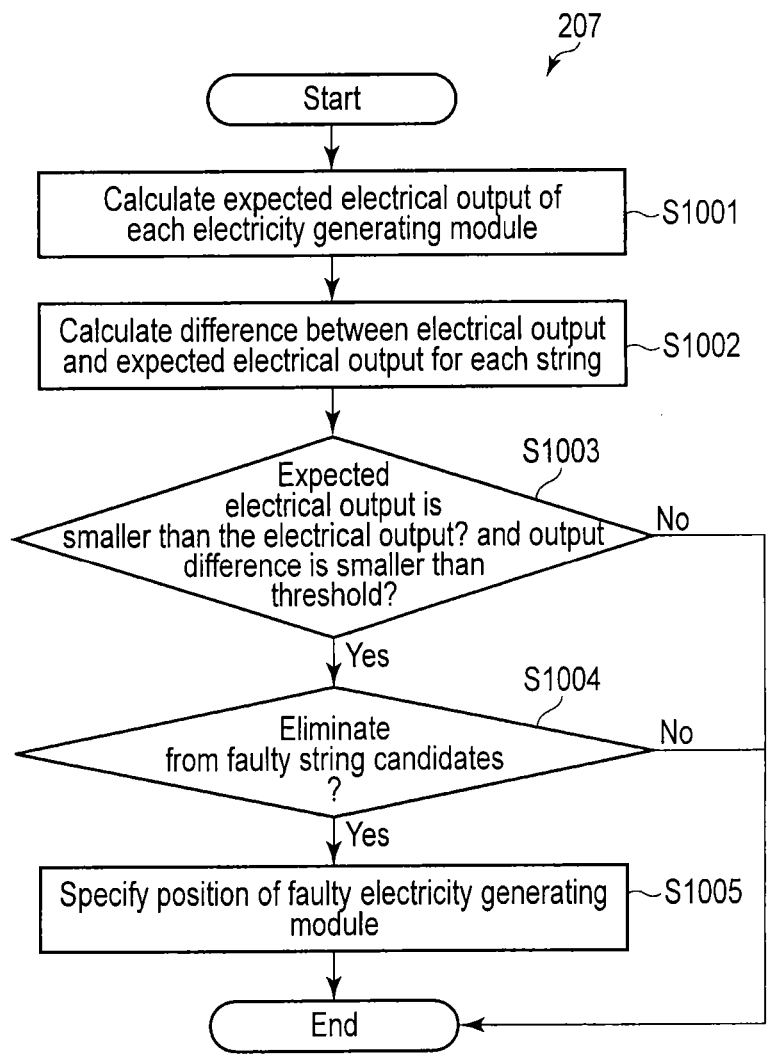
F I G. 10

| Group | Electrical output (kW) | Expected electrical output | Output difference | |
|---|---|---|---|---|
| A | 204 | 206 | -2 | |
| B | 206 | 211 | -5 | |
| C | 216 | 280 | -65 | ⎫ 1101 |
| D | 414 | 501 | -87 | ⎭ |
| E | 911 | 782 | 128 | |
| F | 1010 | 968 | 42 | |
| G | 426 | 519 | -93 | ⎫ 1101 |
| H | 618 | 594 | 24 | |
| I | 720 | 735 | -15 | |
| J | 862 | 854 | 8 | |
| K | 990 | 945 | 45 | |
| L | 990 | 981 | 9 | |
| M | 950 | 931 | 19 | |
| N | 950 | 971 | -21 | |
| O | 890 | 1084 | -194 | ⎫ 1101 |
| P | 1060 | 1050 | 10 | |
| Q | 1070 | 1096 | -26 | |
| R | 920 | 923 | -3 | |

FIG. 11A

| | | | | | | | | | | | | | | | |
|---|---|---|---|---|---|---|---|---|---|---|---|---|---|---|---|
| A | 41 | 41 | 41 | 41 | 41 | 41 | 57 | 93 | 146 | 183 | 186 | 186 | 186 | 186 | 186 | M |
| B | 42 | 42 | 42 | 42 | 42 | 47 | 75 | 117 | 166 | 191 | 194 | 194 | 194 | 194 | 194 | N |
| C | 56 | 56 | 56 | 56 | 56 | 72 | 113 | 160 | 193 | 199 | 217 | 217 | 217 | 217 | 217 | O |
| D | 100 | 100 | 100 | 100 | 102 | 122 | 153 | 183 | 198 | 198 | 210 | 210 | 210 | 210 | 210 | P |
| E | 156 | 156 | 156 | 156 | 158 | 169 | 184 | 196 | 199 | 198 | 220 | 219 | 219 | 219 | 219 | Q |
| F | 193 | 193 | 193 | 193 | 196 | 194 | 197 | 197 | 197 | 196 | 185 | 184 | 184 | 184 | 184 | R |

FIG. 11B

|  | Panel 1 |  |  |  |  |
|---|---|---|---|---|---|
| A | 1 | 2 | 3 | 4 | 5 |
| B | 6 | 7 | 8 | 9 | 10 |
| C | 11 | 12 | 13 | 14 | 15 |

|  | Panel 3 |  |  |  |  |
|---|---|---|---|---|---|
| G | 31 | 32 | 33 | 34 | 35 |
| H | 36 | 37 | 38 | 39 | 40 |
| I | 41 | 42 | 43 | 44 | 45 |

|  | Panel 5 |  |  |  |  |
|---|---|---|---|---|---|
| M | 61 | 62 | 63 | 64 | 65 |
| N | 66 | 67 | 68 | 69 | 70 |
| O | 71 | 72 | 73 | 74 | 75 |

|  | Panel 2 |  |  |  |  |
|---|---|---|---|---|---|
| D | 16 | 17 | 18 | 19 | 20 |
| E | 21 | 22 | 23 | 24 | 25 |
| F | 26 | 27 | 28 | 29 | 30 |

|  | Panel 4 |  |  |  |  |
|---|---|---|---|---|---|
| J | 46 | 47 | 48 | 49 | 50 |
| K | 51 | 52 | 53 | 54 | 55 |
| L | 56 | 57 | 58 | 59 | 60 |

|  | Panel 6 |  |  |  |  |
|---|---|---|---|---|---|
| P | 76 | 77 | 78 | 79 | 80 |
| Q | 81 | 82 | 83 | 84 | 85 |
| R | 86 | 87 | 88 | 89 | 90 |

FIG. 16

| Panel | Module | String | Latitude (X) | Longitude (Y) |
|---|---|---|---|---|
| 1 | 1 | A | ... | ... |
| 1 | 2 | A | ... | ... |
| 1 | 3 | A | ... | ... |
| 4 | 5 | K | ... | ... |
| 6 | 90 | R | ... | ... |

FIG. 17

| Panel | String | Electrical output (kW) |
|---|---|---|
| 1 | A | 204 |
| 1 | B | 206 |
| 1 | C | 216 |
| 2 | D | 414 |
| 2 | E | 911 |
| 2 | F | 1010 |
| 3 | G | 426 |
| 3 | H | 618 |
| 3 | I | 720 |
| 4 | J | 862 |
| 4 | K | 990 |
| 4 | L | 990 |
| 5 | M | 950 |
| 5 | N | 950 |
| 5 | O | 890 |
| 6 | P | 1060 |
| 6 | Q | 1070 |
| 6 | R | 920 |

FIG. 18

| Panel 1 | | | | |
|---|---|---|---|---|
| A | 1.03 | 1.03 | 1.03 | 1.03 |
| B | 1.02 | 1.02 | 1.02 | 1.02 |
| C | 0.98 | 0.98 | 0.98 | 0.98 |

| Panel 2 | | | | |
|---|---|---|---|---|
| D | 0.95 | 0.95 | 0.95 | 0.95 |
| E | 0.99 | 0.99 | 0.99 | 0.99 |
| F | 1.00 | 1.00 | 1.00 | 1.00 |

| Panel 3 | | | | |
|---|---|---|---|---|
| G | 1.02 | 1.02 | 1.02 | 1.02 |
| H | 1.03 | 1.03 | 1.03 | 1.03 |
| I | 1.01 | 1.01 | 1.01 | 1.01 |

| Panel 4 | | | | |
|---|---|---|---|---|
| J | 0.99 | 0.99 | 0.99 | 0.99 |
| K | 0.98 | 0.98 | 0.98 | 0.98 |
| L | 0.97 | 0.97 | 0.97 | 0.97 |

| Panel 5 | | | | |
|---|---|---|---|---|
| M | 0.95 | 0.95 | 0.95 | 0.95 |
| N | 0.99 | 0.99 | 0.99 | 0.99 |
| O | 1.10 | 1.10 | 1.10 | 1.10 |

| Panel 6 | | | | |
|---|---|---|---|---|
| P | 1.05 | 1.05 | 1.05 | 1.05 |
| Q | 1.09 | 1.09 | 1.09 | 1.09 |
| R | 0.92 | 0.92 | 0.92 | 0.92 |

F I G. 20

|   | Panel 1 | | | | Panel 3 | | | | Panel 5 | | |
|---|---|---|---|---|---|---|---|---|---|---|---|
| A | 0.198 | 0.198 | 0.198 | G | 0.418 | 0.418 | 0.418 | M | 1.000 | 1.000 | 1.000 |
| B | 0.202 | 0.202 | 0.202 | H | 0.600 | 0.600 | 0.600 | N | 0.960 | 0.960 | 0.960 |
| C | 0.220 | 0.220 | 0.220 | I | 0.713 | 0.713 | 0.713 | O | 0.809 | 0.809 | 0.809 |
|   | Panel 2 | | | | Panel 4 | | | | Panel 6 | | |
| D | 0.435 | 0.435 | 0.435 | J | 0.871 | 0.871 | 0.871 | P | 1.010 | 1.010 | 1.010 |
| E | 0.920 | 0.920 | 0.920 | K | 1.010 | 1.010 | 1.010 | Q | 0.982 | 0.982 | 0.982 |
| F | 1.010 | 1.010 | 1.010 | L | 1.021 | 1.021 | 1.021 | R | 1.000 | 1.000 | 1.000 |

F I G. 21

| Texture | Sunshine level |
|---|---|
| | 0.0~0.3 |
| | 0.3~0.5 |
| | 0.5~0.7 |
| | 0.7~0.9 |
| | 0.9~ |

F I G. 22B

| | Panel 1 | | | | Panel 3 | | | | Panel 5 | | |
|---|---|---|---|---|---|---|---|---|---|---|---|
| A | 0.200 | 0.200 | 0.200 | G | 0.200 | 0.279 | 0.455 | M | 0.980 | 0.980 | 0.980 |
| B | 0.207 | 0.207 | 0.207 | H | 0.226 | 0.363 | 0.566 | N | 0.981 | 0.981 | 0.981 |
| C | 0.220 | 0.220 | 0.220 | I | 0.355 | 0.557 | 0.790 | O | 0.985 | 0.985 | 0.985 |

| | Panel 1 cont. | | Panel 3 cont. | | Panel 5 cont. | |
|---|---|---|---|---|---|---|
| A | 0.200 | 0.200 | G | 0.715 | 0.896 | M | 0.980 | 0.980 |
| B | 0.207 | 0.207 | H | 0.805 | 0.925 | N | 0.981 | 0.981 |
| C | 0.220 | 0.220 | I | 0.953 | 0.985 | O | 0.985 | 0.985 |

| | Panel 2 | | | | Panel 4 | | | | Panel 6 | | |
|---|---|---|---|---|---|---|---|---|---|---|---|
| D | 0.435 | 0.435 | 0.435 | J | 0.615 | 0.774 | 0.922 | P | 1.000 | 1.000 | 1.000 |
| E | 0.788 | 0.788 | 0.788 | K | 0.862 | 0.937 | 1.000 | Q | 1.008 | 1.005 | 1.005 |
| F | 0.965 | 0.965 | 0.965 | L | 0.999 | 1.015 | 1.015 | R | 1.007 | 1.002 | 1.002 |

| | Panel 2 cont. | | Panel 4 cont. | | Panel 6 cont. | |
|---|---|---|---|---|---|---|
| D | 0.435 | 0.435 | J | 1.001 | 1.001 | P | 1.000 | 1.000 |
| E | 0.800 | 0.999 | K | 1.013 | 1.011 | Q | 1.005 | 1.005 |
| F | 0.965 | 0.999 | L | 1.015 | 1.011 | R | 1.002 | 1.002 |

FIG. 25

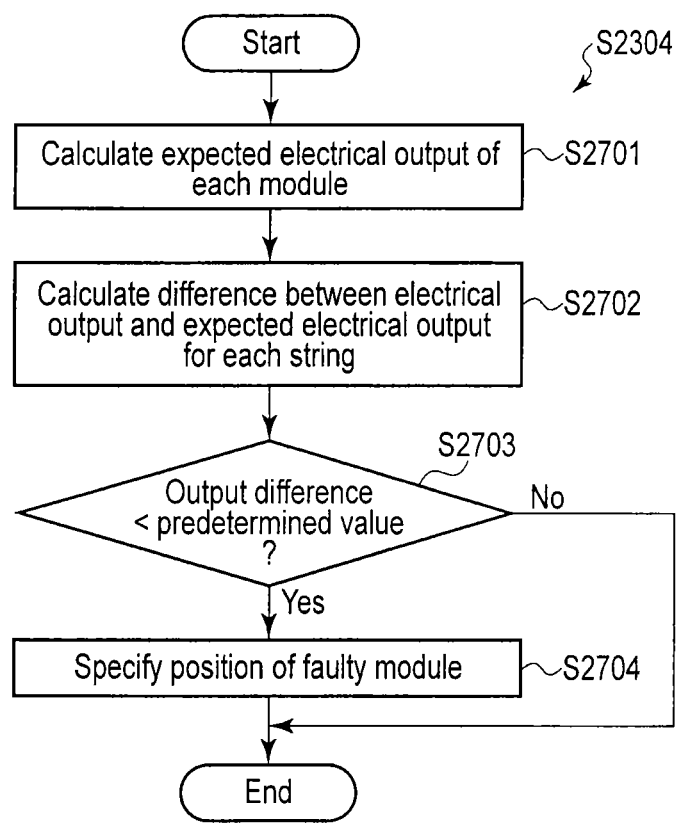

| | Panel 1 | | | |
|---|---|---|---|---|
| A | 41 | 41 | 41 | 41 |
| B | 42 | 42 | 42 | 42 |
| C | 56 | 56 | 56 | 56 |

| | Panel 2 | | | |
|---|---|---|---|---|
| D | 100 | 100 | 100 | 102 |
| E | 156 | 156 | 156 | 158 |
| F | 193 | 193 | 193 | 196 |

| | Panel 3 | | | |
|---|---|---|---|---|
| G | 41 | 57 | 93 | 146 | 183 |
| H | 47 | 75 | 117 | 166 | 191 |
| I | 72 | 113 | 160 | 193 | 199 |

| | Panel 4 | | | |
|---|---|---|---|---|
| J | 122 | 153 | 183 | 198 | 198 |
| K | 169 | 184 | 196 | 199 | 198 |
| L | 194 | 197 | 197 | 197 | 196 |

| | Panel 5 | | | |
|---|---|---|---|---|
| M | 186 | 186 | 186 | 186 | 186 |
| N | 194 | 194 | 194 | 194 | 194 |
| O | 217 | 217 | 217 | 217 | 217 |

| | Panel 6 | | | |
|---|---|---|---|---|
| P | 210 | 210 | 210 | 210 | 210 |
| Q | 220 | 219 | 219 | 219 | 219 |
| R | 185 | 184 | 184 | 184 | 184 |

FIG. 28

| String | Electrical output (kW) | Expected electrical output | Output difference |
|---|---|---|---|
| A | 204 | 206 | -2 |
| B | 206 | 211 | -5 |
| C | 216 | 250 | -34 |
| D | 414 | 451 | -37 |
| E | 911 | 782 | 128 |
| F | 1010 | 968 | 42 |
| G | 426 | 519 | -93 |
| H | 618 | 594 | 24 |
| I | 720 | 735 | -15 |
| J | 862 | 854 | 8 |
| K | 990 | 945 | 45 |
| L | 990 | 981 | 9 |
| M | 950 | 931 | 19 |
| N | 950 | 971 | -21 |
| O | 890 | 1084 | -194 |
| P | 1060 | 1050 | 10 |
| Q | 1070 | 1096 | -26 |
| R | 920 | 923 | -3 |

FIG. 29

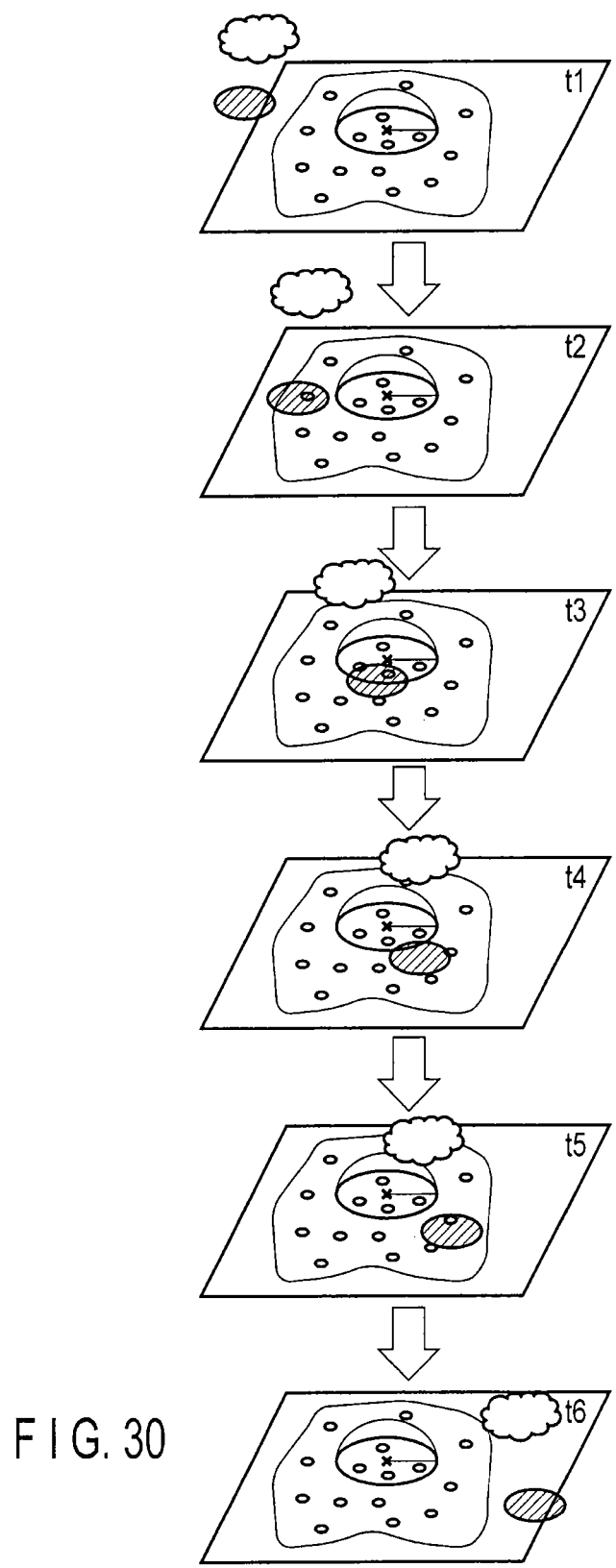
F I G. 30

FAULT DETECTION APPARATUS AND FAULT DETECTION METHOD

CROSS REFERENCE TO RELATED APPLICATIONS

This application is a Continuation Application of PCT Application No. PCT/JP2010/068873, filed Oct. 25, 2010 and based upon and claiming the benefit of priority from Japanese Patent Applications No. 2010-042897, filed Feb. 26, 2010; and No. 2010-100113, filed Apr. 23, 2010, the entire contents of all of which are incorporated herein by reference.

FIELD

Embodiments described herein relate generally to a fault detection apparatus and a fault detection method.

BACKGROUND

A photovoltaic electricity generating system comprises strings, in which multiple electricity generating modules are connected in series, and senses electrical output (energy or current) for each string. The electrical output of an electricity generating module gradually decreases because of deterioration over time even under the same sunshine conditions. It is also possible that electrical output suddenly decreases because of a fault such as deterioration of product quality or physical damage. The output of such a faulty electricity generating module falls to almost zero, and the module no longer contributes to electricity generation.

To repair or exchange an electricity generating module whose electrical output has suddenly decreased as soon as possible, a fault detection apparatus is necessary. For example, if sensors (such as ammeters) capable of measuring the electrical outputs of all electricity generating modules are provided, it is possible to recognize a faulty electricity generating module if its sensor indicates zero when the level of sunshine is high.

However, it is difficult to provide electrical output sensors for all electricity generating modules because of the manufacturing cost. A conventional system recognizes that a string contains a faulty module by comparing the electrical outputs of strings. For example, the system calculates the average electrical output per string, and determines there is a fault if the actual electrical output of a string is below average by 20%.

BRIEF DESCRIPTION OF THE DRAWINGS

FIG. 1 is a conceptual diagram of a fault detection system.
FIG. 2 is a block diagram of a fault detection apparatus.
FIG. 3 is a flowchart showing the operation of the detection apparatus.
FIG. 4A illustrates an example of module positional data stored in the module positional data storage unit.
FIG. 4B illustrates another example of module positional data stored in the module positional data storage unit.
FIG. 6A illustrates an example of output characteristic model.
FIG. 6B illustrates an example of output characteristic model stored in the output characteristic model storage unit under the sunshine condition.
FIG. 9A illustrates an example of the first processing of the correction processing of the sunshine condition spatial correction unit.
FIG. 9B illustrates an example of the second processing of the correction processing.
FIG. 10 is a flowchart showing the operation of the electrical output fault detection unit.
FIG. 11A illustrates an example of the expected electrical output per string.
FIG. 11B illustrates an example of the expected electrical output per electricity generating module.
FIG. 16 illustrates the identification numbers of the electricity generating modules and the identification symbols of the strings of the photovoltaic electricity generating system according to the second embodiment of the present invention.
FIG. 17 illustrates an example of positional data stored in the module positional data storage unit.
FIG. 18 illustrates an example of the electrical output stored in the electrical output data storage unit.
FIG. 20 illustrates an example of scale parameter of the output characteristic model set for each electricity generating module.
FIG. 21 illustrates an example of the level of sunshine calculated for each electricity generating module.
FIG. 22B illustrates example parameters used in FIG. 22A.
FIG. 25 illustrates an example of the sunshine condition for each electricity generating module after spatial correction.

FIG. 26B illustrates example parameters used in FIG. 26A.

FIG. 27 is a flowchart showing an example of the method for determining a faulty electricity generating module based on the sunshine condition after spatial correction.

FIG. 28 illustrates an example of expected electrical output for each electricity generating module calculated based on the sunshine condition after spatial correction.

FIG. 29 illustrates an example of the determination method based on the difference between the expected output of the string in which the expected electrical output for each electricity generating module is added and the data stored in the electrical output data.

FIG. 30 illustrates an example of the method for determining a faulty electricity generating module by sequentially obtaining the electrical output data.

DETAILED DESCRIPTION

Figures 5A, 5B:
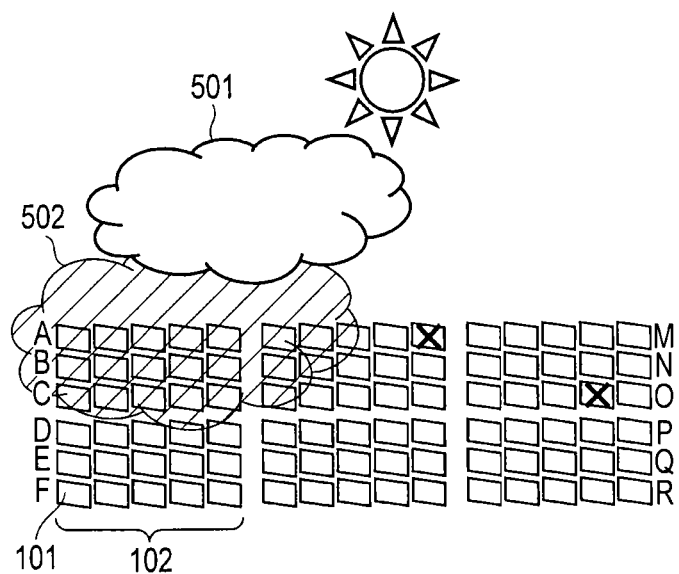
FIG. 5A illustrates an example of sunshine condition.
FIG. 5B illustrates an example of electrical output data stored in the electrical output data storage unit under the sunshine condition shown in FIG. 5A.

In general, according to one embodiment, a fault detection apparatus comprises a sunshine condition estimation unit configured to receive an actual electrical output from a string that is a unit in which a plurality of electricity generating modules are connected in series, and an output characteristic model based on which an electrical output is estimated depending on a sunshine condition affecting electricity generation, and to set a value of sunshine condition in the output characteristic model which is closest to the actual electrical output as a sunshine condition estimate for each string based on the received actual electrical output and output characteristic model; a sunshine condition spatial correction unit configured to calculate a first total estimate that is a sum of sunshine condition estimates of all output characteristic models included in a target string, to calculate a second total estimate that is a sum of sunshine condition estimates of all electricity generating modules included in each of first adjacent strings adjacent to both lengthwise surfaces of the target string, and to correct the sunshine condition estimates of the target string so that the first total estimate falls within a range determined by the second total estimates; and an electrical output fault detection unit configured to identify a faulty electricity generating module when a difference between the actual electrical output and a sum of expected electrical outputs of the electricity generating modules calculated by using the output characteristic model and the corrected sunshine condition estimates within each string is greater than or equal to a first threshold, and the actual electrical outputs is smaller than the sum of the expected electrical outputs.

In the following, the fault detection apparatus and a fault detection method according to the embodiment will be described in details with reference to the drawings. In the embodiments described below, units specified by the same reference number carry out the same operation, and may only be explained once.

An example of the fault detection system in the photovoltaic electricity generating system including the fault detection apparatus according to the first embodiment will be explained with reference to FIG. 1.

A fault detection system 100 comprises an electricity generating module 101, a measurement device 103, a controller 104, and a fault detection apparatus 105.

The electricity generating module 101 is an electricity generating panel capable of generating electricity by receiving light such as sunlight. A string 102 is formed of a plurality of the electricity generating modules 101 connected in series.

In FIG. 1, a plurality of strings 102 are provided each of which includes five electricity generating modules 101 connected in series.

The strings 102 are connected to respective measurement devices 103, and the measurement device 103 measures the output current or output voltage of the corresponding string 102.

The controller 104 controls the release voltages of the strings 102.

The fault detection apparatus 105 receives measurement values of the strings 102 measured by the measurement devices 103, and determines a faulty string 102 or a faulty electricity generating module 101 based on the measurement values. The measurement devices 103 may be connected to a server (not shown in the figures), instead of the fault detection apparatus 105, and the outputs of the measurement devices 103 may be stored in the server. In this case, the remotely provided fault detection apparatus 105 may receive data from the server to determine a faulty string 102 or a faulty electricity generating module 101.

Next, the fault detection apparatus according to the present embodiment will be explained with reference to FIG. 2.

The fault detection apparatus 105 according to the present embodiment comprises a module positional data storage unit 201, an electrical output data storage unit 202, an output characteristic model storage unit 203, a sunshine condition estimation unit 204, a module sunshine condition storage unit 205, a sunshine condition spatial correction unit 206 and a faulty electrical output detection unit 207.

The module positional data storage unit 201 stores positional data indicating the position where each electricity generating module is provided as module positional data. The module positional data will be explained with reference FIG. 4 later.

The electrical output data storage unit 202 stores electricity values measured for a predetermined period that are associated with the respective strings 102 as electrical output data. The electrical output data may be current or voltage.

The output characteristic model storage unit 203 stores output characteristic models for the respective electricity generating modules 101, based on which the electrical output can be estimated depending on the sunshine condition affecting electricity generation such as the level of sunshine or temperature. The output characteristic model may be any model based on which an expected electrical output indicating an estimate of electrical output of the electricity generating module 101 in accordance with the sunshine condition can be calculated. For example, a neural network or a linear regression model may be used as a model to calculate the expected electrical output. The output characteristic model stored in the output characteristic model storage unit 203 will be explained with reference to FIG. 6 later.

The sunshine condition estimation unit 204 receives the electrical output data from the electrical output data storage unit 202, and receives the output characteristic model from the output characteristic model storage unit 203. The sunshine condition estimation unit 204 sets the value of the sunshine condition in the output characteristic model which is the closest to the electrical output data as the sunshine condition estimate based on the received data. Concretely, the level of sunshine obtained by applying the electrical output data to the output characteristic model is calculated for each electricity generating module 101 as the sunshine condition estimate.

The module sunshine condition storage unit 205 receives the sunshine condition estimate from the sunshine condition estimation unit 204, and stores the estimate. The module sunshine condition storage unit 205 receives a corrected sunshine condition estimate from sunshine condition spatial correction unit 206 described below, and stores the corrected estimate.

The sunshine condition spatial correction unit 206 receives the module positional data from the module positional data storage unit 201, and receives the sunshine condition estimate from the module sunshine condition storage unit 205. The sunshine condition spatial correction unit 206 performs spatial correction based on the module positional data to improve continuity of sunshine condition estimates of adjacent electricity generating modules 101. The operation of the sunshine condition spatial correction unit 206 will be explained with reference to FIGS. 8 and 9 later.

The faulty electrical output detection unit 207 receives the electrical output data from the electrical output data storage unit 202, the output characteristic model from the output characteristic model storage unit 203, and the updated sunshine condition estimate from the module sunshine condition storage unit 205. The faulty electrical output detection unit 207 compares the expected electrical output calculated based on the output characteristic model (concretely, the sum of expected electrical outputs of all electricity generating modules 101 in a string 102) with the actual electrical output data, and determines an electricity generating module 101 whose output decreases and that may be faulty. The fault includes a state where the module is completely broken and cannot generate electricity, and a state where the electrical output is greatly lower than the expected electrical output. For example, if the electrical output of a module is about 50% of the expected electrical output, the module is considered to be faulty. The operation of the faulty electrical output detection unit 207 will be explained with reference to FIGS. 10 and 11 later.

The operation of the fault detection apparatus will be explained in detail with reference to the flowchart of FIG. 3.

In step S301, the module positional data is read into the module positional data storage unit 201, and the output characteristic model is read into the output characteristic model storage unit 203. The measurement device 103 measures the electrical output for each string 102 at regular intervals, and stores the measured outputs into the electrical output data storage unit 202. The module positional data and the output characteristic model may be read periodically or when the apparatus is initially started up by means of an externally provided reading means, and may be stored in the module positional data storage unit 201 and the output characteristic model storage unit 203, respectively.

In step S302, the sunshine condition estimation unit 204 estimates the sunshine condition for each electricity generating module 101 based on the electrical output data, and calculates the sunshine condition estimates.

In step S303, the sunshine condition spatial correction unit 206 performs spatial correction by referring to the sunshine condition and the module positional data for each electricity generating module 101.

In step S304, the faulty electrical output detection unit 207 determines whether or not the electricity generating modules 101 are faulty by using the corrected sunshine condition estimates for the respective electricity generating modules 101.

The operation of the fault detection apparatus according to the present embodiment will be explained in detail.

First, an example of the module positional data will be explained in detail with reference to FIG. 4.

In FIG. 4A, a string 102 includes five electricity generating modules 101 arranged side by side. Three sets of vertically arranged six strings 102 are horizontally arranged, and 18 strings (90 electricity generating modules 101) are arranged in FIG. 4A in total. Each of the electricity generating modules 101 has an ID of 1, 2, . . . , 90, and each string has a group ID. For example, a string 102 having electricity generating modules 101 whose IDs are 1 to 5 is assigned as a group ID, "A." Hereinafter, a string having the group ID, "A," is called "string A." In this figure, 18 strings are provided; however, the number of the strings and the arrangement of the strings may vary.

FIG. 4B is a table in which the module positional data 401 including the ID, group ID, and X- and Y-coordinates for each electricity generating module 101 shown in FIG. 4A is stored. The X- and Y-coordinates may be the coordinates on the artificial grids as used in the module positional data 401, or may be more specific values such as the latitude and longitude.

An example of the electrical output data will be explained in detail with reference to FIG. 5.

FIG. 5A shows the electrical output data under the condition where shadow 502 because of cloud 501 lies over the strings 102 arranged as shown in FIG. 4A. Concretely, it is assumed that shadow 502 because of cloud 501 lies over strings A, B, C, G, H and I, and a fault is detected in the electricity generating modules 101 whose IDs are 35 and 74 (hereinafter, referred to as electricity generating modules 35 and 74).

FIG. 5B is a table indicating the electrical output data for each string 102 under the condition shown in FIG. 5A stored in the electrical output data storage unit 202. The table includes the electrical output sampled within a certain period for each string. The electrical output may be an average output within the certain period, or a total output within the certain period. According to FIG. 5B, the electrical outputs of the electricity generating modules 101 over which shadow 502 lies are lower than those of the other electricity generating modules 101.

An example of the output characteristic model will be explained in detail with reference to FIG. 6.

FIG. 6A shows the values of scale parameter r for each electricity generating module. It is possible to reflect the quality difference between the electricity generating modules or information about faulty electricity generating modules detected before by using the parameter r. For example, if r of an electricity generating module having the average electrical output is 1.0, the quality of an electricity generating module whose r is 1.05 exceeds the average electricity generating module by 5%. For electricity generating modules whose calibrations at the time of manufacture or installation show excellent results, r may be set to higher. The values of r of all the electricity generating modules may be set to be identical to, or different from each other. For an electricity generating module that has been detected as faulty, and has not been exchanged, r should be set to 0.0 not to be used for fault detection processing.

FIG. 6B shows example output characteristic models using the scale parameter r for each electricity generating module. The graph indicates how the electrical output changes in accordance with the level of sunshine. Output characteristic model 601 is a basic model indicating the output characteristics in the case where r is 1.0. Output characteristic model 602 indicates the output characteristics in the case where r is below 1.0. Based on these output characteristic models, the expected electrical output can be determined. In the example shown in FIG. 6, an univariate model is used; however, a bivariate model in which temperature, for example, is added may be used. By using the scale parameter r as an index indicating the state of each electricity generating module, it is possible to realize fault detection in consideration of the quality difference or faulty modules detected before.

Estimation processing of the sunshine condition estimation unit 204 will be explained in detail with reference to FIGS. 7A to 7C.

Figures 7A, 7B, 7C:
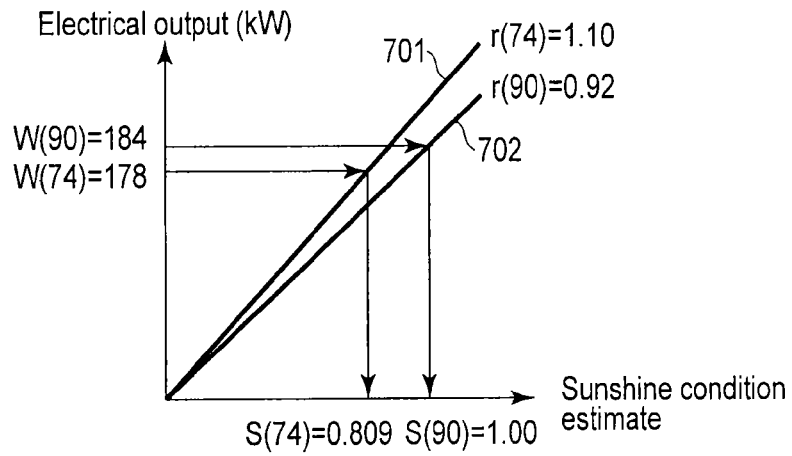
FIG. 7A illustrates another example of output characteristic model.
FIG. 7B illustrates an example of the level of sunshine for each electricity generating module.
FIG. 7C illustrates an example of visualized result of the level of sunshine shown in FIG. 7B.

FIG. 7A shows the output characteristics using the scale parameter r shown in FIG. 6A. The basic model of the output characteristic model shown in FIG. 7A is given by $$W = 200 \times S, \quad (1)$$

where W is the electrical output, and S is the sunshine condition estimate. If the scale parameter of an electricity generating module i (i is any natural number) is r(i), the output characteristic model can be given by $$W(i) = 200 \times r(i) \times S(i). \quad (2)$$

In FIG. 7A, output characteristic model 701 indicates the output characteristics of the electricity generating module 74, and output characteristic model 702 indicates the output characteristics of the electricity generating module 90. When the electrical output data for each string 102 is provided, the sunshine condition estimate is given by $$S(i) = W(i)/r(i)/200. \quad (3)$$

For example, according to FIG. 5B, the electrical output of string O in which five electricity generating modules including the electricity generating module 74 are connected in series is 890 kW. The sunshine condition estimate of the electricity generating module 74 is given by $$S(74) = 890/5/1.10/200 = 0.809. \quad (4)$$

Similarly, the sunshine condition estimate of the electricity generating module 90 is S (90)=1.00 by using the output characteristic model 702. If r(i)=0, the module is not used for fault detection, and calculation is not carried out.

FIG. 7B shows the results of calculation of the sunshine condition estimate for each string 102. Blocks 703 and 704 indicate the results of the electricity generating modules 74 and 90, respectively. Since the electrical output is obtained for each string 102, it is assumed that the sunshine condition estimates of the electricity generating modules 101 within each string 102 are identical.

Figures 7D, 8:
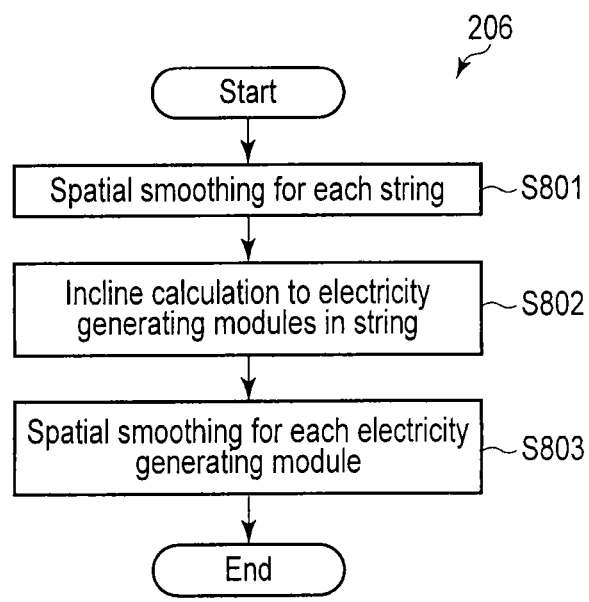
FIG. 7D illustrates an example of parameter used in FIG. 7D.
FIG. 8 is a flowchart showing the operation of the sunshine condition spatial correction unit.

FIG. 7C visually expresses the results shown in FIG. 7B in accordance with the sunshine condition estimates by using textures. FIG. 7D shows the textures corresponding to the sunshine condition estimates. According to FIG. 7C, the sunshine condition estimate of string O is lower than that of neighboring strings.

The spatial correction processing in the sunshine condition spatial correction unit 206 will be explained in detail with reference to the flowchart of FIG. 8 and FIG. 9. It is considered that the sunshine condition has spatial continuity. Accordingly, accurate sunshine condition estimation is possible by correcting the estimate to improve the spatial continuity by using the positional information.

In step S801, spatial smoothing is performed to the string 102 which indicates variations in sunshine level. The spatial smoothing is performed by using the sunshine condition estimate of a target string 102 and the sunshine condition estimates of strings 102 adjacent to both sides of the target string 102 that have electricity generating modules 101 whose distances to the respective electricity generating modules 101 of the target string 102 are smallest, and differences of distances which are smallest (hereinafter, referred to as adjacent strings).

The lengthwise surface represents a longitudinal edge for a rectangular string, and represents an undulating edge for an uneven string.

Concretely, in FIG. 7B, the sunshine condition estimate 0.982 of string Q is smaller than the sunshine condition estimate 1.01 of string P directly above string Q, and is smaller than the sunshine condition estimate 1.00 of string R directly below string Q. It hardly ever happens that such a V-shape variation is shown within a small range. In this case, the sunshine condition estimate of string Q is corrected based on the average sunshine condition estimate of strings P and R as $$S(Q) = (S(P) + S(R))/2 \quad (5)$$
$$= (1.010 + 1.000)/2$$
$$= 1.005.$$

FIG. 9A shows the sunshine condition estimate for each string 102 after the processing of step S801 has been completed. The spatial smoothing is performed not only for the case where the V-shaped variation occurs, but also for the case where only the middle string 102 within three continuous strings 102 has the high sunshine condition estimate (inverted V-shape condition).

In step S802, if the sunshine condition estimate of the target string 102 falls between the sunshine condition estimates of strings 102 adjacent to both of the short-side surfaces of the target string 102, the sunshine condition estimates are redistributed within the target string 102 not to change the total sunshine condition estimate of the target string 102. Since it is assumed that the sunshine condition estimates within a single string 102 are the same, spatial continuity is realized by setting the sunshine condition estimates of the electricity generating modules 101 to gradually increase or decrease without changing the total sunshine condition estimate.

An example of redistribution of sunshine condition estimates will be explained in detail. In FIG. 9A, in accordance with the sunshine condition estimate of string A, that is laterally adjacent to string G901 (right of string A), 0.198, the sunshine condition estimate of electricity generating module 31 which is closest to string A within string G901 is set to 0.198. Next, in accordance with the sunshine condition estimate of string M, 1.000, the sunshine condition estimate of electricity generating module 35 which is next to string M within string G901 is set to 1.000. Finally, the other electricity generating modules 32, 33 and 34 are set not to change the total sunshine condition estimate of string G901, which is 0.418×5=2.09. In this example, the sunshine condition estimates of electricity generating modules 32 and 33 are set to 0.198, and the sunshine condition estimate of electricity generating module 34 is set to 0.496. The sunshine condition estimates of the other modules are set to gradually increase. This example adopts three-step processing; however, another processing including more than three steps may be adopted.

FIG. 9B shows the results of gradient calculation for the sunshine condition estimates of the electricity generating modules shown in FIG. 9A within each string.

Figures 9C, 9D:
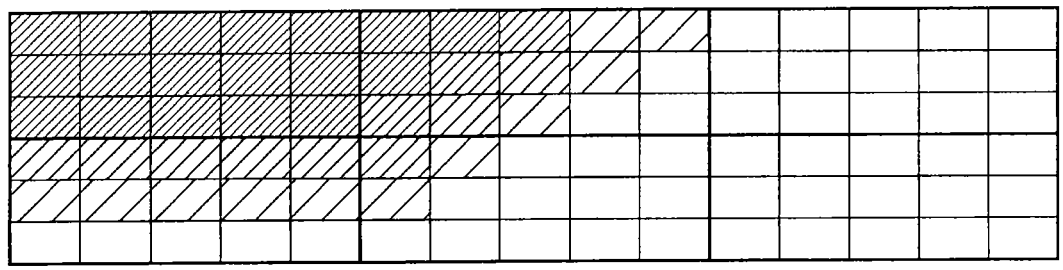
FIG. 9C illustrates an example of the third processing of the correction processing.
FIG. 9D illustrates an example of the visualized result of the correction processing shown in FIG. 9C.

In step S803, spatial smoothing is performed for each electricity generating module, and the corrected sunshine condition estimates are obtained as updated sunshine condition estimates. In step S803, smoothing using spatial average, spatial median, or Markov probability may be used for spatial smoothing processing. FIG. 9C shows the results of spatial smoothing for each electricity generating module by using the spatial average.

In FIG. 9C, the corrected sunshine condition estimate of each electricity generating module is obtained by taking an average of the sunshine condition estimates of a target module and eight modules adjacent to the target module. FIG. 9D shows the results shown in FIG. 9C with the texture indicated in FIG. 7D, in accordance with the corrected sunshine condition estimates. Comparing to the sunshine condition estimates before spatial correction as shown in FIG. 7C, the spatial continuity of sunshine condition is improved. The spatial correction is achieved by the above operations. Base on the spatial correction, it is possible to obtain the corrected sunshine condition estimates whose spatial continuity is improved. If the string is a square, the operations of steps S801 and S802 may be applied to any adjacent strings. For example, the operation of step S802 may be applied to surrounding strings of the target string without performing the operation of step S801.

The spatial correction is performed for two strings arranged at both sides of the target string; however, the operation of step S801 may be performed for other strings lined up at both sides of the target string.

The fault detection performed at the faulty electrical output detection unit 207 will be explained in detail with reference to the flowchart shown in FIG. 10.

In step S1001, an expected electrical output of each electricity generating module is calculated. Concretely, if the value of electricity generating module i is S'(i), the expected electrical output W'(i) of the module is given by $$W'(i)=200 \times r(i) \times S'(i). \quad (6)$$

In step S1002, an output difference between the electrical output and the expected electrical output of each string is calculated. Since the electrical output is obtained merely for each string, the electrical output is compared with the total expected electrical outputs of each electricity generating module within a string.

In step S1003, it is determined whether the expected electrical output is smaller than the electrical output, and the output difference is smaller than a threshold, for each string. If there is no string in which the expected electrical output is smaller than the electrical output, and the output difference is smaller than the threshold, the fault detection is terminated. If there are one or more strings in which the expected electrical output is smaller than the electrical output, and the output difference is smaller than the threshold, these strings are regarded as faulty string candidates, and step S1004 is executed.

In step S1004, referring to the output differences of the strings adjacent to the lengthwise surface of a target string, it is determined whether the string is eliminated from the faulty string candidates. Concretely, if the output differences of adjacent strings are large, these strings are eliminated from the faulty string candidates since there is a low possibility of two adjacent strings being faulty. If there is a string to be eliminated from the faulty string candidates, the string is eliminated from the candidates, and the step S1005 is executed with the other strings regarded as the faulty string candidates. If there is no string to be eliminated from the faulty string candidates, the step S1005 is executed with all the faulty string candidates. If all the candidates are eliminated, and there is no faulty string candidate, the fault detection is terminated.

In step S1005, the position of the faulty module is defined by comparing the output difference with the expected electrical output for each electricity generating module.

An example of the fault detection of faulty electrical output detection unit 207 will be explained in detail with reference to FIGS. 11A to 11C.

Figure 11C:
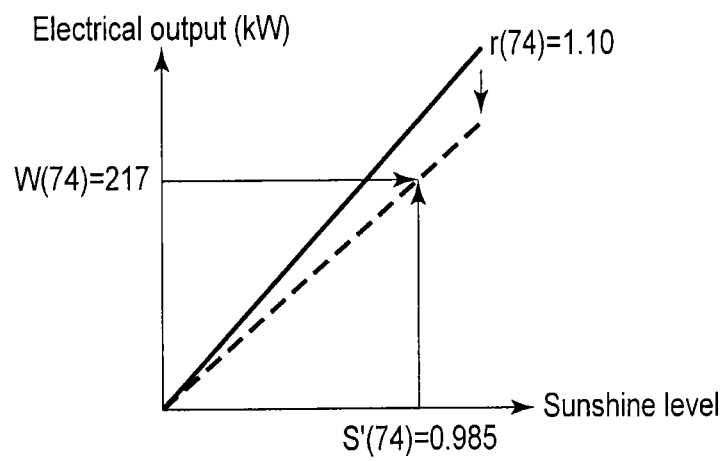
FIG. 11C illustrates an example of the output characteristic model.

FIG. 11A is a table indicating the electrical output, expected electrical output and output difference of each string. FIG. 11B shows the expected electrical output of each electricity generating module, and FIG. 11C shows an example of expected electrical output calculated from the output characteristic model. FIG. 11C shows the expected electrical output of electricity generating module 74. Concretely, the expected electrical output of electricity generating module 74 is given by $$W'(74)=200 \times 1.10 \times 0.985 \approx 217 \text{ (kW)}. \quad (7)$$

If a threshold used in step S1003 is Δ=50, in FIG. 11A, strings C, D, G and O whose output difference is smaller than −50 are extracted as candidates of faulty strings 1101. Next, the continuous strings C and D are eliminated from the candidates of faulty strings 1101, and strings G and O are determined to be faulty strings 1101.

Finally, the position of the faulty electricity generating module within the faulty string 1101 is determined. For string G, the output difference is −93. Assuming that two electricity generating modules are not broken at the same time, this output difference cannot be obtained if the electricity generating module whose expected electrical output is 93 or less is faulty. Accordingly, electricity generating modules 31 and 32 are eliminated from the candidates, and it is determined that one of electricity generating modules 33, 34 and 35 is faulty. For string O, the output difference is −194, and there is a possibility that all modules 86 to 90 in string O are faulty.

Figure 12:
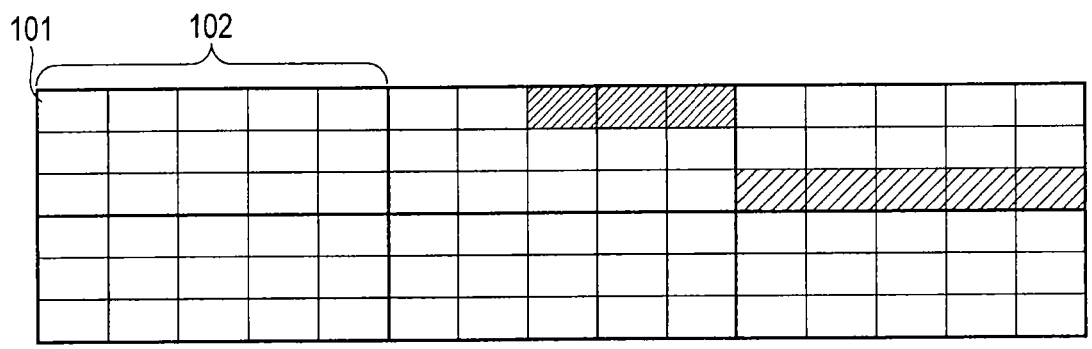
FIG. 12 illustrates an example of the visualized result of the fault detection processing.

FIG. 12 shows an example of the finally output results of fault detection.

In FIG. 12, two faulty strings are detected; one has faulty electricity generating modules stemming from the center to the right side. As shown in FIG. 12, the positions of faulty electricity generating modules may be visually indicated, or may be numerically indicated to a user. The fault detection indicated above may synthetically detect a fault by using multiple detection results. In this case, the positions of faulty electricity generating modules can be specified more accurately.

Figure 13:
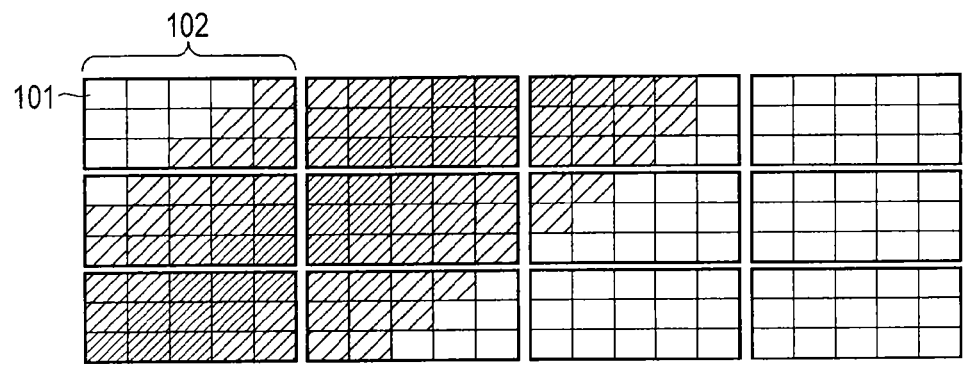
FIG. 13 illustrates an example of the visualized result of the sunshine condition estimate in the long-term electrical output data.
Figure 14:
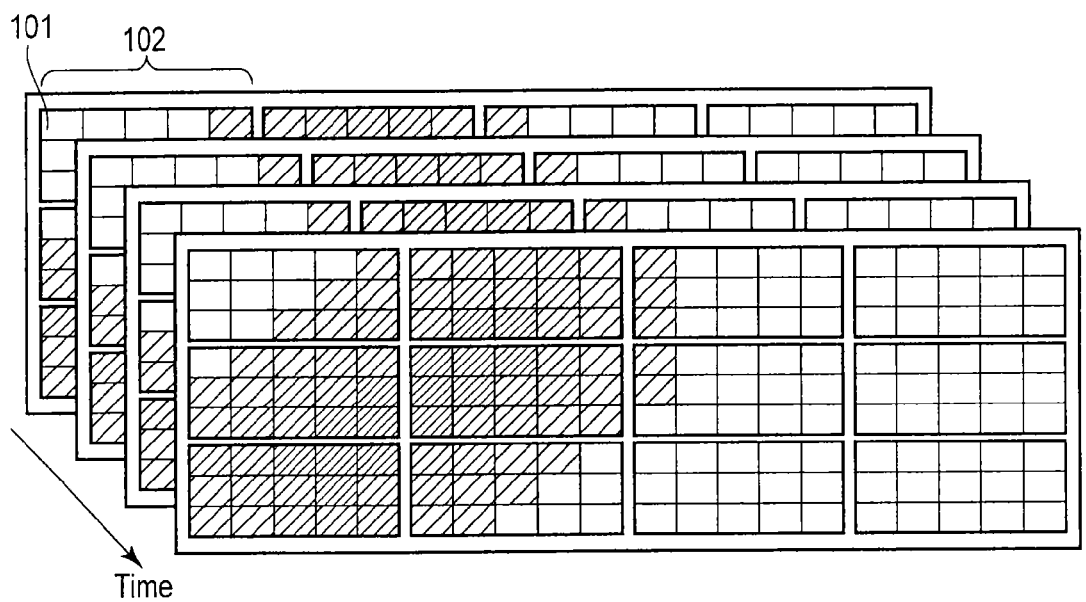
FIG. 14 illustrates an example of the visualized result of the sequential sunshine condition estimate.

FIGS. 13 and 14 show the results of fault detection using the electrical output data measured for a long time.

As shown in FIG. 13, it is assumed that belt-like sunshine variations appear. However, in the present embodiment, fault detection can be performed for continuous variations regardless the shape of variations. FIG. 14 shows the electrical output data stored in a storage unit for storing sunshine condition estimate of each module for each predetermined period. As stated above, when space-time correction is performed by adding temporal correction, the precision sunshine condition can be obtained, and accurate fault detection is realized.

According to the aforementioned embodiment, it is possible to accurately detect a fault by correcting the electrical outputs of the electricity generating modules to improve spatial continuity, and to estimate the position of a faulty electricity generating module.

Next, the fault detection apparatus and the fault detection method according to the second embodiment will be described in details with reference to the drawings. In the embodiments described below, units specified by the same reference number as in the first embodiment carry out the same operation as in the first embodiment, and may only be explained once.

Figure 15:
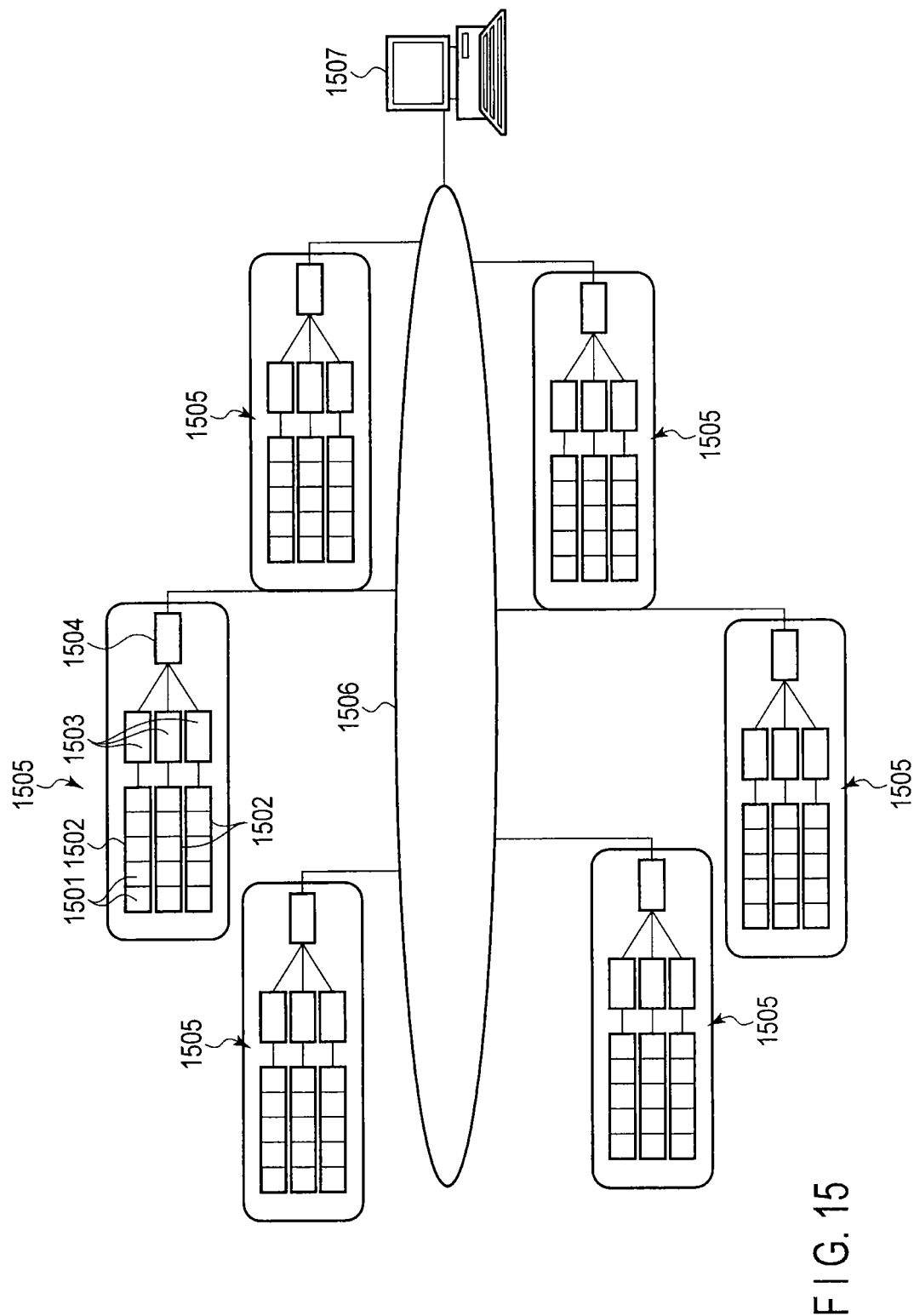
FIG. 15 illustrates an example of the configuration of a photovoltaic electricity generating system according to the second embodiment of the present invention.

FIG. 15 roughly shows a photovoltaic electricity generating system and the fault detection apparatus according to the second embodiment. The photovoltaic electricity generating system comprises a plurality of electricity generating panels 1505 connected to a remote diagnostic server 1507 via a network 1506. Each electricity generating panel 1505 comprises a plurality of strings 1502, a measurement device 1503 for measuring the output current and output voltage of the corresponding string 1502, and a communication device 1504 for transmitting the output current and output voltage measured at the measurement device 1503 to the remote diagnostic server 1507. The string 1502 comprises a plurality of electricity generating modules 1501 connected in series. In FIG. 15, six communication devices 1504 of corresponding electricity generating panels are connected via the network 1506. The output voltage and output current of each string 1502 of five electricity generating panels are supplied to the remote diagnostic server 1507. The remote diagnostic server 1507 comprises the fault detection apparatus 105 as shown in FIG. 2.

The configurations of the aforementioned fault detection apparatus may be realized by hardware or software only, or a combination of hardware and software.

FIG. 16 shows an example of positional data of electricity generating module stored in the module positional data storage unit 201. The module positional data storage unit 201 stores positional data indicating the position in which each electricity generating module is arranged as module positional data. The photovoltaic electricity generating system shown in FIG. 15 will be explained by using symbols and numbers shown in FIG. 16 below.

In FIG. 16, six electricity generating panels 1505 in each of which 15 electricity generating modules 1501 are arranged in a matrix having 3 rows and 5 columns are provided. Each of the electricity generating modules 1501 has an ID of 1, 2, ..., 90. Each string 1502 which comprises five electricity generating modules connected in series has a group ID. For example, string 1502 whose group ID is A comprises electricity generating modules whose IDs are 1 to 5.

As shown in FIG. 17, the module positional data storage unit 201 stores the IDs of electricity generating modules 1501, group IDs of strings 1502, IDs of electricity generating panels 1505 and coordinates of locations of electricity generating modules 1501 (X- and Y-coordinates). The X- and Y-coordinates may be the coordinates on the artificial grids, or may be the latitude and longitude. The coordinates of locations may be any coordinates having a resolution to specify the locations of electricity generating modules 1501.

The electrical output data storage unit 202 stores output voltage and output current measured by the measurement device 1503. In the present embodiment, the electrical output data storage unit 202 stores actual output within a predetermined period for each string 1502 as electrical output data. The fault detection apparatus is configured to present the output voltage and output current measured by the measurement device 1503 to a user by means of a monitor of the remote diagnostic server 1507 or an externally connected display unit.

FIG. 18 shows an example of electrical output data of the photovoltaic electricity generating system show in FIG. 16. The electrical output data of FIG. 18 is obtained under the condition where shadow because of cloud lies over strings 1502 whose IDs are A, B, C, G, H and I among the six electricity generating panels 1505 whose IDs are 1 to 6.

The electrical output data shown in FIG. 18 indicates the sum of electrical outputs calculated based on the output voltages and output currents measured within the predetermined period. The electrical output data may be the average of electrical outputs within the predetermined period or the sum of the outputs. In the following example, the case where electricity generating modules 1501 whose IDs are 35 and 74 are faulty will be explained.

Figure 19:
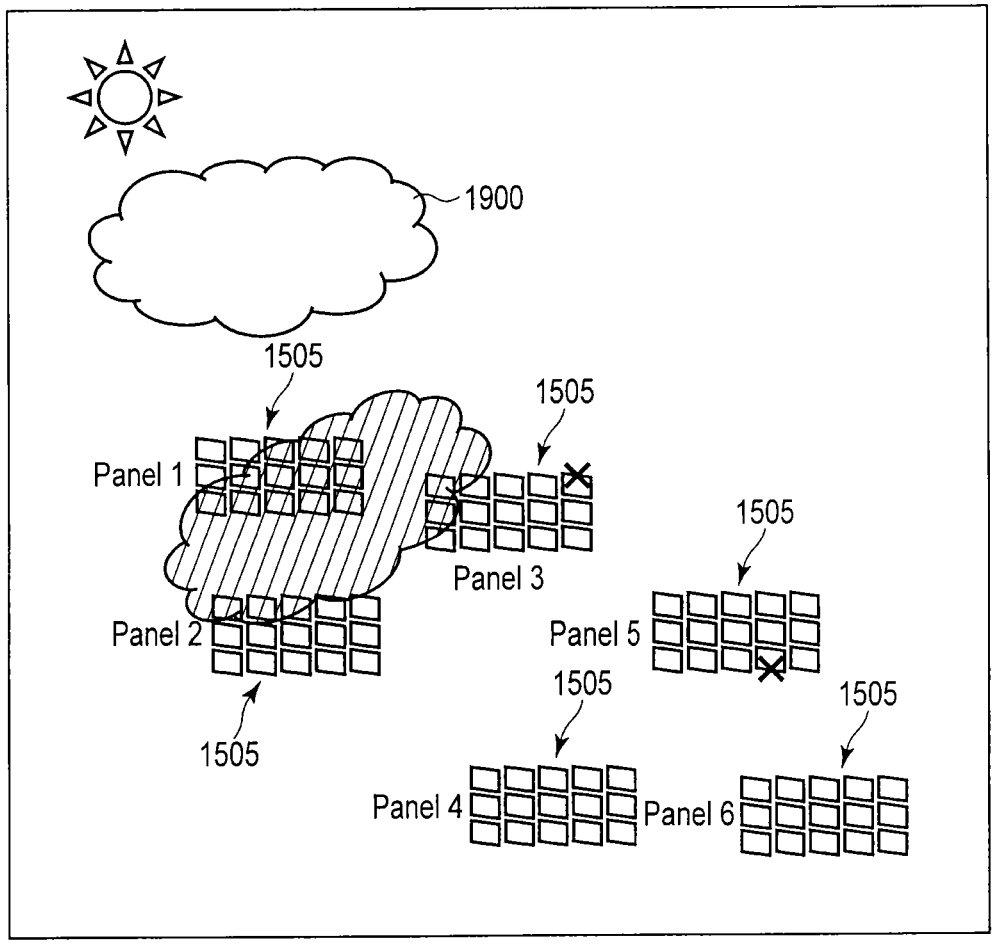
FIG. 19 illustrates the sunshine condition at the time when the electrical output shown in FIG. 18 is obtained.

FIG. 19 shows an example of sunshine condition where the electrical output data shown in FIG. 18 is obtained. Six electricity generating panels 1505 are separately arranged. The electricity generating panel 1505 whose ID is 1 is placed under shadow because of cloud 1900, and the level of sunshine is low. The electricity generating panel 1505 whose ID is 3 is placed partly under shadow because of cloud 1900, and the level of sunshine is low. On this condition, the electrical outputs of strings 1502 whose IDs are A, B, C, G, H and I tend to be lower than those of the other strings 1502.

The output characteristic model storage unit 203 stores output characteristic models for the respective electricity generating modules 1501, based on which the electrical output can be estimated depending on the sunshine condition affecting electricity generation such as the level of sunshine or temperature. The output characteristic model may be any model based on which an electrical output estimate can be calculated in accordance with the sunshine condition. For example, a neural network or a linear regression model may be used as the model.

FIG. 6B shows an example of the output characteristic models. In the model shown in FIG. 6B, the output characteristic is defined by the basic model 601 and the scale parameter r. The basic model 601 is an output characteristic model of an average electricity generating module relative to the sunshine levels. For example, the output characteristic where the scale parameter is r is indicated as graph 602. The expected electrical output of the electricity generating module 1501 is determined by calculating the Y-value relative to the sunshine level indicated on the X-axis by using the graph 602.

In the example shown in FIG. 6B, an univariate output characteristic model which uses the sunshine level as a variable is used; however, a bivariate output characteristic model in which the sunshine level and temperature, for example, are used as variables may be used.

FIG. 20 shows an example of the scale parameter R set for each electricity generating module 1501. The scale parameter r may be set to a value reflecting the quality difference between electricity generating modules 1501 or the fault detected before. For example, the electricity generating module 1501 whose r is 1.05 is higher in electrical output than the average electricity generating module 1501 by 5%. For electricity generating modules 1501 whose calibrations at the time of manufacture or installation show excellent results, r may be set to higher.

The values of r of each electricity generating module may be set to be identical to each other. For an electricity generating module 1501 that has been detected as a faulty module, and has not been exchanged, r should be set to 0.0. By setting the state of each electricity generating module 1501 as a scale parameter r, the output characteristic model in which the quality difference between electricity generating modules 1501 or the fault detected before is considered can be obtained.

The module sunshine condition storage unit 205 is a memory region for temporally storing the sunshine condition estimate for each electricity generating module 1501. The module sunshine condition storage unit 205 is provided within a temporally storage region on the remote diagnostic server 1507.

The output sunshine condition estimation unit 204 is configured to compute the most likely sunshine condition for the obtained electrical output data for each electricity generating module 1501 by using the electrical output data stored in the electrical output data storage unit 202 and the output characteristic model stored in the output characteristic model storage unit 203. The output sunshine condition estimation unit 204 stores the computed sunshine conditions in the module sunshine condition storage unit 205. For example, the basic model of sunshine condition estimate in the output sunshine condition estimation unit 204 is the same as the model shown in FIG. 7A.

Figure 22A:
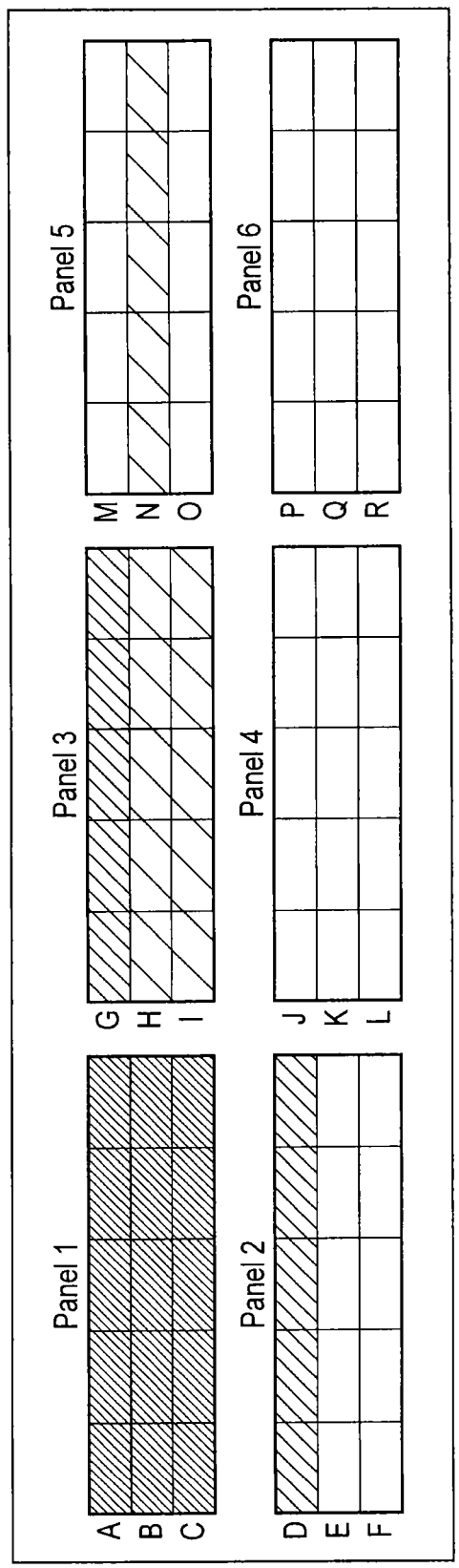
FIG. 22A illustrates the level of sunshine shown in FIG. 21 with textures.
Figure 22B:
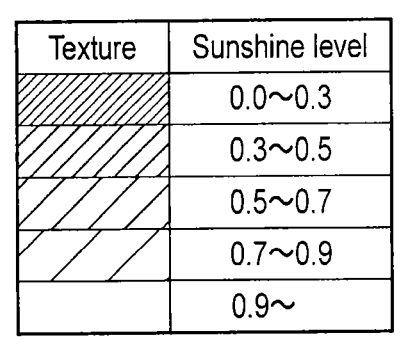

FIG. 21 shows example sunshine levels of all electricity generating modules 1501 estimated as stated above. In FIG. 22A shows the estimated sunshine levels by using different textures indicated in FIG. 22B. In FIGS. 21 and 22A, the sunshine level estimated at the electricity generating module 1501 included in the string 1502 whose ID is O is lower than the sunshine levels estimated for surrounding strings 1502.

It is considered that the sunshine level should be spatially continuous. Accordingly, sunshine levels can be estimated more accurately if the sunshine condition estimates are corrected to improve spatial continuity by using the positional data of the electricity generating modules 1501.

The sunshine condition spatial correction unit 206 comprises a spatial smoothing unit for setting the sunshine condition estimate of a certain electricity generating module 1501 to an average of the sunshine condition estimates of the other electricity generating modules within a predetermined region including the certain electricity generating module 1501. The spatial smoothing unit specifies the other electricity generating modules 1501 within a predetermined region stemming from the positional data of a target electricity generating module stored in the module positional data storage unit 201, and performs spatial correction to the sunshine level of the target electricity generating module stored in the module sunshine condition storage unit 205 in order to improve the continuity of estimated sunshine levels between the target electricity generating module and the other electricity generating modules. The corrected sunshine levels are stored in the module sunshine condition storage unit 205.

The faulty electrical output detection unit 207 comprises a unit of calculating expected electrical output of the electricity generating module 1501, a unit of calculating the output difference ΔW between the total expected electrical outputs of the electricity generating modules 1501 of each string 1502 and the actual electrical output data, a unit of detecting a string 1502 whose output difference ΔW exceeds a threshold as a faulty string, and a unit of specifying a possible faulty electricity generating module 1501 by comparing the output difference ΔW of the faulty string and the expected electrical output of each electricity generating module 1501 within the faulty string.

The faulty electrical output detection unit 207 compares the expected electrical output of the output characteristic model when the estimated sunshine condition is assumed to be correct with the electrical output data, and detects an electricity generating module whose output is assumed to decline.

Figure 23A:
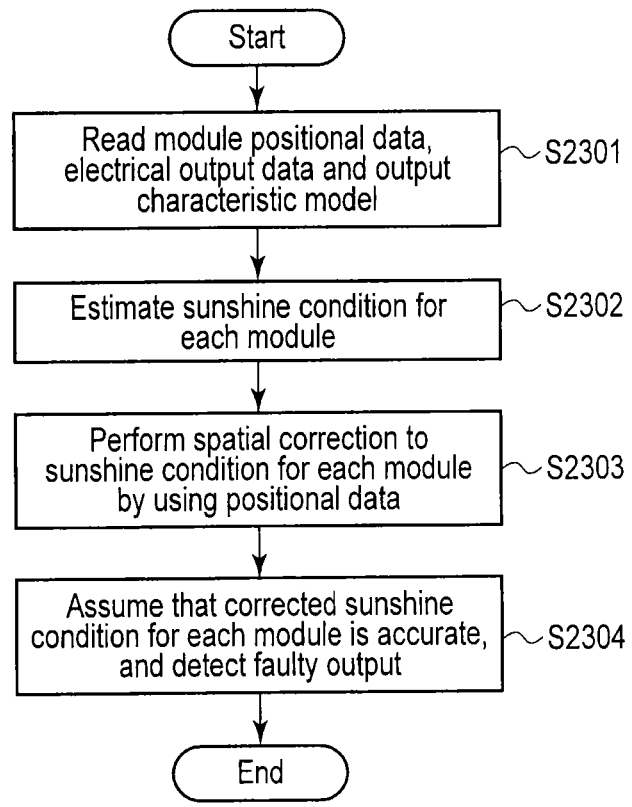
FIG. 23A is a flowchart showing an example of the operation of the fault detection apparatus according to an embodiment of the present invention.

FIG. 23A shows a flowchart explaining the operation of fault detection. First, the fault detection apparatus reads the positional data stored in the module positional data storage unit 201, the electrical output data stored in the electrical output data storage unit 202, and the output characteristic model stored in the output characteristic model storage unit 203 (step S2301). The output sunshine condition estimation unit 204 estimates the sunshine level by using the positional data, electrical output data, and output characteristic model (step S2302), and stores the estimated sunshine level in the module sunshine condition storage unit 205. Then, the sunshine condition spatial correction unit 206 performs spatial correction to the estimated sunshine level by using the positional data (step S2303).

Figure 23B:
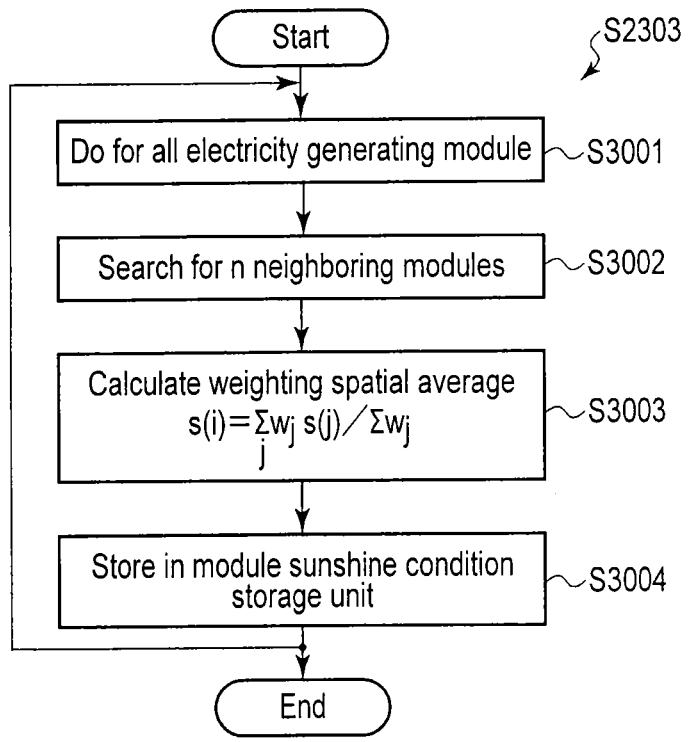
FIG. 23B is a flowchart showing an example of the operation of the spatial correction of the sunshine condition for each electricity generating module by using the positional data.

FIG. 23B shows a flowchart explaining an example of spatial correction. First, the spatial smoothing unit of the sunshine condition spatial correction unit 206 searches N electricity generating modules 1501 closest to a target electricity generating module 1501 (step S3002). The distance between electricity generating modules 1501 can be obtained by the positional coordinates stored in the module positional data storage unit 201.

Then, the sunshine level s of the target electricity generating module 1501 is estimated based on the sunshine levels s of all electricity generating modules 1501 placed within a hemisphere of radius τ centered on the target electricity generating module 1501. In the present embodiment, the sunshine level s is estimated by using a spatial average technique in which weights are assigned by the kernel method (step S3003). The kernel interpolation is described in detail in Interactive Spatial Data Analysis, Trevor Bailey, and Tony Gatrell (1996), Prentice Hall (ISBN: 0582244935). The spatial average in which weights are assigned is given by $$s(i) = \sum_j w_j s(j) / \sum_j w_j, \qquad (1)$$

where the weight is given by $$\sum_j w_j = 1. \qquad (2)$$

Figure 24:
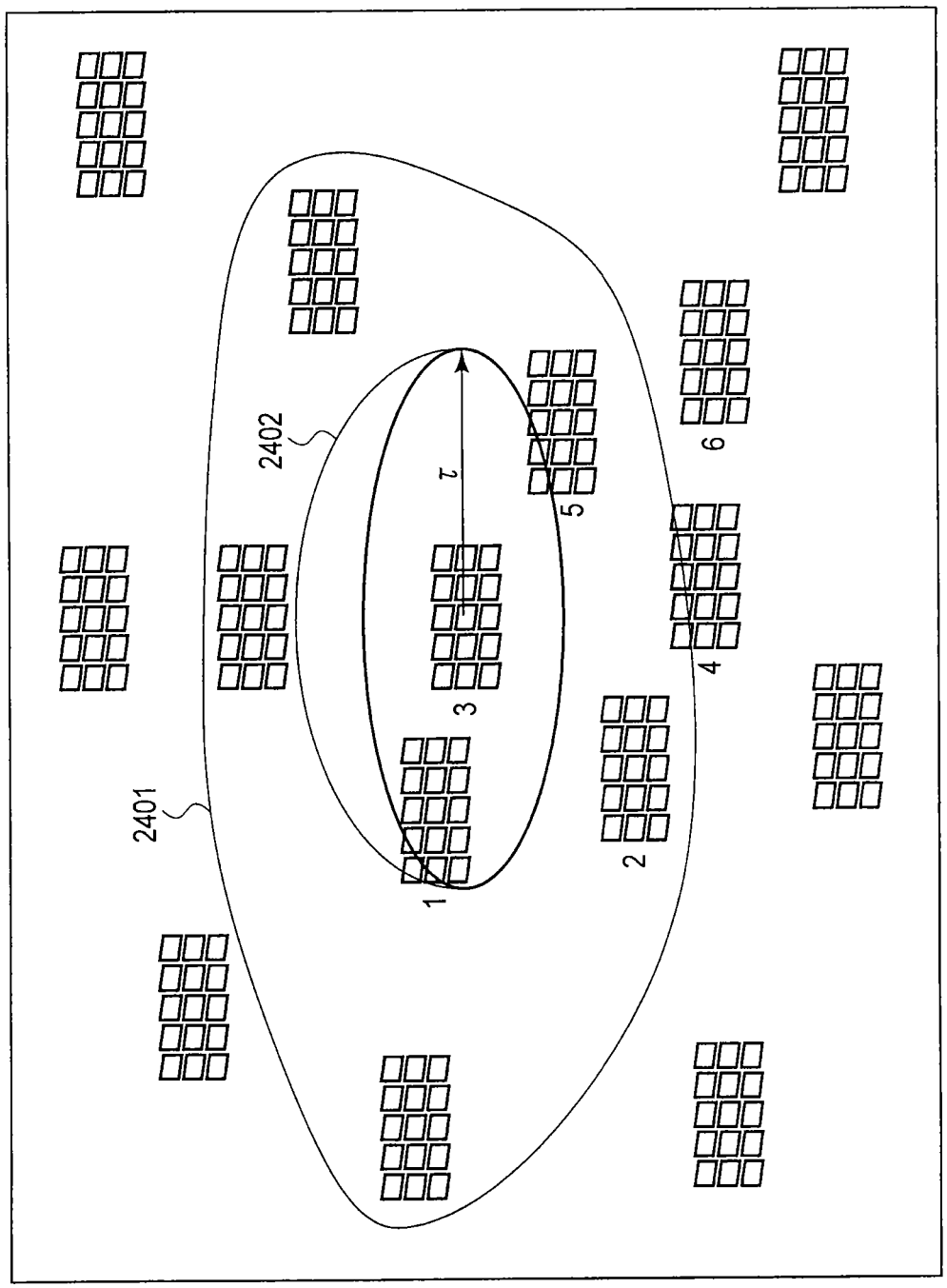
FIG. 24 illustrates an example of the method for spatial correction of the sunshine condition for each electricity generating module.

FIG. 24 is a diagram to explain the spatial average technique in which weights are assigned. In FIG. 24, a target electricity generating module 1501 is the electricity generating module 1501 whose ID is 38 included in the string 1502 whose ID is H of the electricity generating panel 1505 whose ID is 3. The sunshine level of the target electricity generating module 1501 is estimated based on the average of sunshine levels of electricity generating modules 1501 within region 2402 that is a hemisphere of a radius τ centered on the target electricity generating module 1501.

When using the sunshine levels of the electricity generating modules 1501 within the region 2402, a weight is assigned to each electricity generating module 1501 according to the distance between the target electricity generating module 1501 and the respective modules. To reflect the sunshine level of the electricity generating modules 1501 close to the target electricity generating module 1501 to the calculation results, the following kernel function is uses as weighting technique:

$$w_j = k\left(\frac{(l_i - l_j)}{\tau}\right), \qquad (3)$$

where l is a two-dimensional vector indicating the position of an electricity generating module 1501. The representative kernel function is $$k(u) = \begin{cases} \frac{3}{\pi}(1 - u'u)^2 & \text{where } u'u \leq 1 \\ 0 & \text{the other cases.} \end{cases} \quad (4)$$

The sunshine level of the target electricity generating module 1501 calculated by using the above kernel function is stored in the module sunshine condition storage unit 205 (step S3004). The above processing is performed for all electricity generating modules 1501 within the target region 2402 (step S3001) to improve spatial continuity of sunshine levels.

Figure 26A:
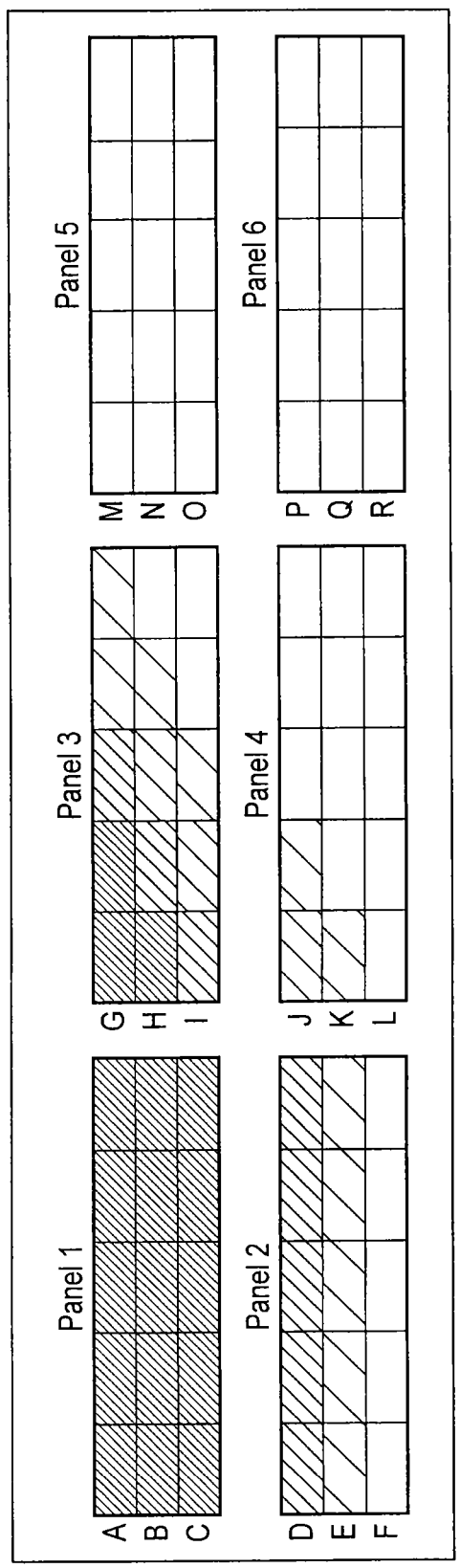
FIG. 26A illustrates the sunshine condition shown in FIG. 25 with textures.

FIG. 25 shows an example of spatial smoothing results for each electricity generating module 1501 obtained by performing spatial average processing. FIG. 26A shows the corrected sunshine levels by the above-mentioned processing by different textures indicated in FIG. 26B. By performing the above processing, it is possible to estimate the sunshine levels whose spatial continuity is high. The actual sunshine condition is assumed to have high spatial continuity. Thus, it is possible to detect a faulty electricity generating module 1501 by using more accurate sunshine levels.

The faulty electrical output detection unit 207 compares the expected electrical output of the output characteristic model when the estimated sunshine condition is assumed to be correct with the electrical output data, and detects an electricity generating module whose output is assumed to decline (step S2304).

FIG. 27 shows a flowchart explaining an example of electrical output fault detection. First, the expected electrical output is calculated for each electricity generating module 1501 (step S2701). The electrical output is calculated by the estimated sunshine level for each electricity generating module 1501. Concretely, if the corrected sunshine level of the electricity generating module 1501 whose ID is i is S'(i), the expected electrical output W'(i) of this electricity generating module 1501 is given by $$W'(i)=200 \times r(i) \times S'(i).$$

FIG. 28 shows the estimation results of the expected electrical output for each electricity generating module 1501. For example, the expected electrical output of the electricity generating module 1501 whose ID is 74 is given by $$W'(74)=200 \times 1.10 \times 0.985 \ 217 \ (kW).$$

Then, the expected electrical outputs are added within each string 1502, and the total expected electrical output is compared with the electrical output obtained for each string 1502 (step S2702).

FIG. 29 shows an example of calculation results for each string 1502. A string in which the difference ΔW between the expected electrical output and the electrical output obtained for each string 1502 is less than or equal to a threshold is extracted (step S2703). If the threshold is −50, the strings 1502 whose IDs are G and O are extracted in the example of FIG. 29.

Finally, the difference ΔW and the expected electrical output of each module are compared to each other, and the position of a faulty electricity generating module 1501 is specified (step S2704). For example, if it is assumed that the difference ΔW of the string 1502 whose ID is G is −93, and two electricity generating modules 1501 are not faulty at the same time, this difference ΔW cannot be obtained when the modules whose expected electrical output falls below 93 are faulty. Thus, the electricity generating modules 1501 whose IDs are 31 and 32 are eliminated from the faulty candidates, and it is determined that an electricity generating module 1501 within the modules whose IDs are 33 and 34 is faulty. The difference ΔW of the string 1502 whose ID is O is −194, and it is possible that all electricity generating modules 1501 in this string are faulty.

When performing fault detection, it is possible to synthetically detect a fault by using multiple detection results. In this case, the positions of faulty electricity generating modules can be specified more accurately.

FIG. 30 is a diagram to explain an example of the fault detection method for the case where the electrical output data is acquired on the time series. When the electrical output data for each time t1 to t6 is stored, and module sunshine condition storage unit 205 has a storage region for respective times t1 to t6, the sunshine level can be estimated more accurately by applying spatial-time correction. If the electrical output data is acquired on the time series, sunshine condition can be estimated by taking the moving direction and speed of cloud into consideration. For example, the sunshine level of time t2 is corrected so as to continuously change relative to the sunshine levels of times t1 and t3. Correcting the sunshine level of a target time so as to continuously change relative to the sunshine levels before and after the target time realizes accurate fault detection. When detecting a fault, the above fault detection is performed by using the electrical output data acquired for each of times t1 to t6.

As stated above, according to the present embodiment, the fault detection is performed by calculating the expected electrical output taking the sunshine condition into account for each electricity generating module 1501. As a result, it is possible to provide the fault detection apparatus and fault detection method for detecting a fault for each electricity generating module of the photovoltaic electricity generating system.

Namely, according to the fault detection apparatus and fault detection method of the present embodiment, a fault can be detected accurately, and the position of a faulty electricity generating module can be estimated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

REFERENCE SIGNS LIST

100: a fault detection system, 101, 1501: an electricity generating module, 102, 1502: strings, 103, 1503: a measurement device, 104: a controller, a fault detection apparatus, 201: a module positional data storage unit, 202: an electrical output data storage unit, 203: an output characteristic model storage unit, 204: a sunshine condition estimation unit, 205: a module sunshine condition storage unit, 206: a sunshine condition spatial correction unit, 207: an electrical output fault detection unit, 401: module positional data, 501: cloud, 502: shadow, 601, 602, 701, 702: an output characteristic model, 703, 704: blocks, 901: string G, 1101: faulty strings, 1504: a communication device, 1505: electricity generating panels, 1506: a network, 1507: a remote diagnostic server

What is claimed is:

1. A fault detection apparatus comprising:
   a sunshine condition estimation circuit configured to receive an actual electrical output from a string that is a unit in which a plurality of electricity generating modules are connected in series, and an output characteristic model based on which an electrical output is estimated depending on a sunshine condition affecting electricity generation, and to set a value of sunshine condition in the output characteristic model which is closest to the actual electrical output as a sunshine condition estimate for each string based on the received actual electrical output and output characteristic model;
   a sunshine condition spatial correction circuit configured to calculate a first total estimate that is a sum of sunshine condition estimates of all output characteristic models included in a target string, to calculate a second total estimate that is a sum of sunshine condition estimates of all electricity generating modules included in each of first adjacent strings adjacent to both lengthwise surfaces of the target string, and to correct the sunshine condition estimates of the target string so that the first total estimate falls within a range determined by the second total estimates;
   an electrical output fault detection circuit configured to identify a faulty electricity generating module when a difference between the actual electrical output and a sum of expected electrical outputs of the electricity generating modules calculated by using the output characteristic model and the corrected sunshine condition estimates within each string is greater than or equal to a first threshold, and the actual electrical outputs is smaller than the sum of the expected electrical outputs, and to output an identification of the faulty electricity generating module; and
   a unit configured to repair or replace the faulty electricity generating module.

2. The fault detection apparatus of claim 1, wherein the sunshine condition spatial correction unit is configured to replace the first total estimate with an average of the second total estimates when the first total estimate falls below each of the second total estimates of the first adjacent strings by a second threshold or more, and set the average or a value obtained by stepwisely redistributing the first total estimate as a corrected sunshine condition estimate when the average or the first total estimate falls within the range determined by the second total estimate of a second adjacent strings adjacent to a short-side surface of the target string.

3. The fault detection apparatus of claim 2, wherein the sunshine condition spatial correction unit sets an average of the corrected sunshine condition estimate of the target electricity generating module and a corrected sunshine condition estimate of the electricity generating modules adjacent to the target electricity generating module as a new corrected sunshine condition estimate of the target electricity generating module.

4. The fault detection apparatus of claim 1, further comprising:
   a module positional data storage unit configured to store module positional data indicating a place where each of the electricity generating modules is provided,
   wherein the electrical output fault detection unit refers to the module positional data and determines an electricity generating module the expected electrical output of which is greater than or equal to the difference within a string that has been determined to be faulty to be a faulty electricity generating module.

5. The fault detection apparatus of claim 2, further comprising:
   a module positional data storage unit configured to store module positional data indicating a place where each of the electricity generating modules is provided,
   wherein the electrical output fault detection unit refers to the module positional data and determines an electricity generating module the expected electrical output of which is greater than or equal to the difference within a string that has been determined to be faulty to be a faulty electricity generating module.

6. The fault detection apparatus of claim 3, further comprising:
   a module positional data storage unit configured to store module positional data indicating a place where each of the electricity generating modules is provided,
   wherein the electrical output fault detection unit refers to the module positional data and determines an electricity generating module the expected electrical output of which is greater than or equal to the difference within a string that has been determined to be faulty to be a faulty electricity generating module.

7. The fault detection apparatus of claim 4, wherein when two or more continuous strings in order of the first adjacent strings and the target string being adjacent are determined to be faulty strings, the electrical output fault detection unit identifies the continuous strings as non-faulty strings.

8. The fault detection apparatus of claim 5, wherein when two or more continuous strings in order of the first adjacent strings and the target string being adjacent are determined to be faulty strings, the electrical output fault detection unit identifies the continuous strings as non-faulty strings.

9. The fault detection apparatus of claim 6, wherein when two or more continuous strings in order of the first adjacent strings and the target string being adjacent are determined to be faulty strings, the electrical output fault detection unit identifies the continuous strings as non-faulty strings.

10. The fault detection apparatus of claim 1, wherein the output characteristic model is created by multiplying a basic model common to all the electricity generating modules by a scale parameter for each electricity generating module.

11. The fault detection apparatus of claim 2, wherein the output characteristic model is created by multiplying a basic model common to all the electricity generating modules by a scale parameter for each electricity generating module.

12. The fault detection apparatus of claim 3, wherein the output characteristic model is created by multiplying a basic model common to all the electricity generating modules by a scale parameter for each electricity generating module.

13. The fault detection apparatus of claim 4, wherein the output characteristic model is created by multiplying a basic model common to all the electricity generating modules by a scale parameter for each electricity generating module.

14. The fault detection apparatus of claim 5, wherein the output characteristic model is created by multiplying a basic model common to all the electricity generating modules by a scale parameter for each electricity generating module.

15. The fault detection apparatus of claim 1, wherein the sunshine condition is one of a sunshine level relative to the electricity generating module, and a combination of the sunshine level and a temperature.

16. The fault detection apparatus of claim 2, wherein the sunshine condition is one of a sunshine level relative to the electricity generating module, and a combination of the sunshine level and a temperature.

17. The fault detection apparatus of claim 3, wherein the sunshine condition is one of a sunshine level relative to the electricity generating module, and a combination of the sunshine level and a temperature.

18. The fault detection apparatus of claim 4, wherein the sunshine condition is one of a sunshine level relative to the electricity generating module, and a combination of the sunshine level and a temperature.

19. The fault detection apparatus of claim 5, wherein the sunshine condition is one of a sunshine level relative to the electricity generating module, and a combination of the sunshine level and a temperature.

20. The fault detection apparatus of claim 6, wherein the sunshine condition is one of a sunshine level relative to the electricity generating module, and a combination of the sunshine level and a temperature.

21. A fault detection method comprising:
receiving an actual electrical output from a string that is a unit in which a plurality of electricity generating modules are connected in series, and an output characteristic model based on which an electrical output is estimated depending on a sunshine condition affecting electricity generation, and setting a value of sunshine condition in the output characteristic model which is closest to the actual electrical output as a sunshine condition estimate for each string based on the received actual electrical output and output characteristic model;
calculating a first total estimate that is a sum of sunshine condition estimates of all output characteristic models included in a target string, calculating a second total estimate that is a sum of sunshine condition estimates of all electricity generating modules included in each of first adjacent strings adjacent to both lengthwise surfaces of the target string, and correcting the sunshine condition estimates of the target string so that the first total estimate falls within a range determined by the second total estimates;
identifying a faulty electricity generating module when a difference between the actual electrical output and a sum of expected electrical outputs of the electricity generating modules calculated by using the output characteristic model and the corrected sunshine condition estimates within each string is greater than or equal to a first threshold, and the actual electrical outputs is smaller than the sum of the expected electrical outputs, and outputting an identification of the faulty electricity generating module; and
repairing or replacing the faulty electricity generating module.

22. A fault detection apparatus that detects a fault of an electricity generating module of a photovoltaic electricity generating system comprising a string comprising a plurality of electricity generating modules connected in series, a measurement circuit configured to measure electricity output from the string, and a communication circuit configured to output the electricity measured by the measurement circuit, the fault detection apparatus comprising:
an electrical output data storage circuit configured to store a value of electricity output by the communication circuit;
a module positional data storage circuit configured to store positional data indicating a place where each of the electricity generating modules is provided;
an output characteristic model storage circuit configured to store an output characteristic model indicating the relationship between a sunshine condition and an electrical output for each of the electricity generating modules;
a sunshine condition estimation circuit configured to estimate a sunshine condition for each electricity generating module based on the value of electricity output stored in the electrical output data storage circuit and the output characteristic model;
a module sunshine condition storage circuit configured to store the sunshine condition estimated by the sunshine condition estimation circuit;
a sunshine condition spatial correction circuit configured to correct the sunshine condition stored in the module sunshine condition storage circuit by using the positional data;
a faulty electrical output detection circuit configured to calculate an expected electrical output for each electricity generating module based on the corrected sunshine condition and the output characteristic model, and to detect a fault in the plurality of electricity generating modules by comparing the expected electrical output with the value of electrical output stored in the electrical output data storage circuit, and to output an identification of the fault; and
a unit configured to repair or replace the faulty electricity generating module.

23. The fault detection apparatus of claim 22, wherein the sunshine condition includes a sunshine level.

24. The fault detection apparatus of claim 23, wherein the sunshine condition further includes a temperature.

25. The fault detection apparatus of claim 22, wherein the output characteristic model is a characteristic model obtained by multiplying a basic model common to all electricity generating modules by a scale parameter for each electricity generating module.

26. The fault detection apparatus of claim 22, wherein the sunshine condition spatial correction unit comprises a spatial smoothing unit configured to set the sunshine condition estimate of the electricity generating module to be an average of sunshine condition estimates of the other electricity generating modules placed within a predetermined region including the electricity generating module.

27. The fault detection apparatus of claim 22, wherein the faulty electrical output detection unit comprises:
an expected electrical output calculation unit configured to calculate an expected electrical output of the electricity generating module; and
an output difference calculation unit configured to calculate an output difference between a sum of the expected electrical outputs of the electricity generating modules within each of the strings and actual electrical output data;
a detection unit configured to detect a string the output difference of which exceeds a threshold as a faulty string;
an identification unit configured to identify an electricity generating module that may be faulty by comparing the output difference of the faulty string with the expected electrical output of each of the plurality of electricity generating modules within the faulty string.

* * * * *